US012804765B2

(12) United States Patent
Ji et al.

(10) Patent No.: US 12,804,765 B2
(45) Date of Patent: Nov. 17, 2026

(54) DECREASING LATENCY AND SAVING POWER IN SIDELINK COMMUNICATIONS

(71) Applicant: Nokia Technologies Oy, Espoo (FI)

(72) Inventors: Lianghai Ji, Aalborg (DK); Nuno Manuel Kiilerich Pratas, Aalborg (DK); Ling Yu, Espoo (FI); Vinh Van Phan, Oulu (FI); Daniela Laselva, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 306 days.

(21) Appl. No.: 18/551,983

(22) PCT Filed: Dec. 9, 2021

(86) PCT No.: PCT/FI2021/050859
§ 371 (c)(1),
(2) Date: Sep. 22, 2023

(87) PCT Pub. No.: WO2022/200674
PCT Pub. Date: Sep. 29, 2022

(65) Prior Publication Data

US 2024/0179794 A1 May 30, 2024

(30) Foreign Application Priority Data

Mar. 24, 2021 (FI) ..................................... 20215331

(51) Int. Cl.
*H04W 76/28* (2018.01)
*H04W 52/02* (2009.01)

(52) U.S. Cl.
CPC ....... *H04W 76/28* (2018.02); *H04W 52/0216* (2013.01); *H04W 52/0229* (2013.01); *H04W 52/0235* (2013.01)

(58) Field of Classification Search
CPC ... H04L 1/0003; H04L 1/0009; H04L 1/0023; H04L 1/0026; H04L 1/0025;
(Continued)

(56) References Cited

U.S. PATENT DOCUMENTS

| | | | |
|---|---|---|---|
| 9,961,638 | B2 | 5/2018 | Lu et al. |
| 10,721,727 | B2 | 7/2020 | Rico Alvarino et al. |

(Continued)

FOREIGN PATENT DOCUMENTS

| | | | |
|---|---|---|---|
| CN | 112312526 | A | 2/2021 |
| CN | 112399544 | A | 2/2021 |

(Continued)

OTHER PUBLICATIONS

Extended European Search Report received for corresponding European Patent Application No. 21932812.7, dated Jun. 19, 2024, 11 pages.

(Continued)

*Primary Examiner* — Jianye Wu
(74) *Attorney, Agent, or Firm* — Nokia Technologies Oy

(57) ABSTRACT

There is provided a method for an apparatus for a terminal, the method comprising: applying (1401) a first discontinuous reception configuration for communications between the terminal and at least one other terminal, the first discontinuous reception configuration comprising at least one on-duration; determining (1402) whether to indicate the terminal is active in receiving outside the at least one on-duration; and when it is determined to indicate the apparatus is active in receiving outside the on-duration, transmitting (1403) at least one indication to this effect to the one or more of the at least one other terminals.

16 Claims, 14 Drawing Sheets

(58) Field of Classification Search
CPC ....... H04L 1/0027; H04L 5/0092; H04L 5/66; H04L 27/345; H04W 76/28; H04W 52/0216; H04W 52/0229; H04W 52/0235
See application file for complete search history.

(56) References Cited

U.S. PATENT DOCUMENTS

| | | | |
|---|---|---|---|
| 2014/0112194 | A1 | 4/2014 | Novlan et al. |
| 2015/0043515 | A1 | 2/2015 | Zhang et al. |
| 2019/0387572 | A1 | 12/2019 | Nam et al. |
| 2020/0100088 | A1 | 3/2020 | Kim et al. |
| 2020/0154355 | A1 | 5/2020 | Nam et al. |
| 2020/0260381 | A1 | 8/2020 | Nam et al. |
| 2020/0351777 | A1 | 11/2020 | Kim et al. |
| 2020/0351780 | A1 | 11/2020 | Liao et al. |
| 2020/0359314 | A1 | 11/2020 | Wu et al. |
| 2020/0404587 | A1 | 12/2020 | Balasubramanian et al. |
| 2021/0059005 | A1 | 2/2021 | Hosseini et al. |
| 2021/0068053 | A1 | 3/2021 | Nam et al. |
| 2021/0298114 | A1* | 9/2021 | Nam .................. H04W 52/028 |
| 2022/0217635 | A1 | 7/2022 | Lee et al. |
| 2022/0322487 | A1 | 10/2022 | Sabouri-Sichani et al. |
| 2023/0039782 | A1 | 2/2023 | Sarkis et al. |
| 2023/0269695 | A1* | 8/2023 | Thomas ................ H04L 5/0051 455/456.1 |

FOREIGN PATENT DOCUMENTS

| | | | |
|---|---|---|---|
| EP | 2983386 | A1 | 2/2016 |
| EP | 3681227 | A1 | 7/2020 |
| WO | 2018/076988 | A1 | 5/2018 |
| WO | 2020/193704 | A1 | 10/2020 |
| WO | 2020/198418 | A1 | 10/2020 |
| WO | 2021/030832 | A1 | 2/2021 |
| WO | 2022/083952 | A1 | 4/2022 |

OTHER PUBLICATIONS

"Power Savings for Sidelink", 3GPP TSG RAN WG1 Meeting #104-e, R1-2101485, Agenda: 8.11.1.1, Qualcomm Incorporated, Jan. 25-Feb. 5, 2021, 11 pages.
"SL DRX with pre-indicated resources", 3GPP TSG-RAN WG2 Meeting #113 Electronic, R2-2101207, Agenda: 8.15.2.2, Nokia, Jan. 25-Feb. 5, 2021, 2 pages.
"Discussion on Sidelink DRX", 3GPP TSG RAN WG2 Meeting #113-e, R2-2101245, Agenda: 8.15.2.1, Qualcomm Incorporated, Jan. 25-Feb. 5, 2021, 6 pages.
"Discussion on physical layer design considering sidelink DRX operation"; 3GPP TSG RAN WG1 #103-e, R1-2007897, Agenda: 8.11.3, LG Electronics, Oct. 26-Nov. 13, 2020, 15 pages.
"WID revision: NR sidelink enhancement", 3GPP TSG RAN Meeting #89e, RP-201516, Agenda: 9.8.3, LG Electronics, Sep. 14-18, 2020, 6 pages.
"Early data transmission for LTE-MTC", 3GPP TSG-RAN WG1 #89s, R1-1706886, Agenda: 6.2.6.6, Ericsson, May 15-19, 2017, 9 pages.
"Revised WID: Additional MTC enhancements for LTE", 3GPP TSG RAN meeting #83, RP-190770, Agenda: 10.3.1, Ericsson, Mar. 18-21, 2019, 5 pages.
"WID revision: Additional enhancements for NB-IoT", 3GPP TSG RAN meeting #83, RP-190757, Agenda: 10.3.2, Huawei, Mar. 18-21, 2019, 4 pages.
"New WID: UE Power Saving in NR", 3GPP TSG RAN Meetings #84, RP-191607, Agenda: 9.4.6, CATT, Jun. 3-6, 2019, 5 pages.
"3rd Generation Partnership Project; Technical Specification Group Radio Access Network; NR; Study on User Equipment (UE) power saving in NR (Release 16)", 3GPP TR 38.840, V16.0.0, Jun. 2019, pp. 1-74.
"UE Power Consumption Reduction in RRM Measurements", 3GPP TSG RAN WG1 #96, R1-1903136, Agenda: 7.2.9.3, Nokia, Feb. 25-Mar. 1, 2019, 9 pages.
"Discussion on Sidelink DRX", 3GPP TSG RAN WG2#112-e, R2-2009923, Agenda: 8.15.2, Qualcomm Incorporated, Nov. 2-13, 2020, pp. 1-6.
"NR SL DRX", 3GPP TSG RAN WG2 Meeting #112-e, R2-2009993, Agenda: 8.15.2, Fraunhofer IIS, Nov. 2-13, 2020, 4 pages.
"On SL DRX", 3GPP TSG RAN WG2 Meeting #112-electronic, R2-2010332, Agenda: 8.15.2, MediaTek Inc, Nov. 2020, 7 pages.
"Discussion on Sidelink DRX", 3GPP TSG-RAN WG2 Meeting #112-e, R2-2008850, Agenda: 8.15.2, CATT, Nov. 2-13, 2020, pp. 1-3.
"Discussion on Sidelink DRX", 3GPP TSG-RAN WG2 Meeting #112-electronic, R2-2008943, Agenda: 8.15.2, LG Electronics Inc, Nov. 2-13, 2020, pp. 1-6.
"Discussion on Sidelink DRX", 3GPP TSG-RAN WG2 Meeting #112-electronic, R2-2009026, Agenda: 8.15.2, ZTE Corporation, Nov. 2-13, 2020, 5 pages.
Rostami et al., "Novel Wake-up Scheme for Energy-Efficient Low-Latency Mobile Devices in 5G Networks", arXiv, Jan. 3, 2020, 19 pages.
"Consideration on the sidelink DRX for unicast, groupcast and broadcast", 3GPP TSG-RAN WG2 Meeting #112-electronic, R2-2009413, Agenda: 8.15.2, Huawei, Nov. 2-13, 2020, 8 pages.
"Sidelink DRX for Power Saving", 3GPP TSG RAN WG2 Meeting #112-E. R2-2009133, Agenda: 8.15.2, Fujitsu, Nov. 2-13, 2020, pp. 1-16.
"Alignment of DRX wake up times", 3GPP TSG RAN WG2 Meeting #112-E, R2-2008988, Agenda: 8.15.2, Intel Corporation, Nov. 2-13, 2020, 6 pages.
"PDCCH-based power saving signal/channel design", 3GPP TSG RAN WG1 #96bis, R1-1904103, Agenda: 7.2.9.1, vivo, Apr. 8-12, 2019, 7 pages.
"Summary of email discussion/approval [102-e-NR-UEFeatures-PowSav-01]", 3GPP TSG RAN WG1 #102-e, R1-200nnnn, Agenda: 7.2.11, AT&T, Aug. 17-28, 2020, 3 pages.
Office action received for corresponding Finnish Patent Application No. 20215331, dated Aug. 30, 2021, 9 pages.
"Discussion on resource allocation for power saving", 3GPP TSG RAN WG1 Meeting #104-e, R1-2100351, Agenda: 8.11.1.1, CATT, Jan. 25-Feb. 5, 2021, 14 pages.
"NR Sidelink Resource Allocation for UE Power Saving", 3GPP TSG RAN WG1 Meeting #105-e, R1-2104560, Agenda: 8.11.1.1, Fraunhofer HHI, May 10-27, 2021, pp. 1-8.
International Search Report and Written Opinion received for corresponding Patent Cooperation Treaty Application No. PCT/FI2021/050859, dated Mar. 11, 2022, 14 pages.
"3rd Generation Partnership Project; Technical Specification Group Radio Access Network; NR; Medium Access Control (MAC) protocol specification (Release 17)", 3GPP TS 38.321, V17.5.0, Jun. 2023, pp. 1-253.
"3rd Generation Partnership Project; Technical Specification Group Radio Access Network; NR; Physical layer procedures for data (Release 17)", 3GPP TS 38.214, V17.6.0, Jun. 2023, pp. 1-231.
"3rd Generation Partnership Project; Technical Specification Group Radio Access Network; NR; Physical layer procedures for data (Release 16)", 3GPP TS 38.214, V16.4.0, Dec. 2020, pp. 1-169.
"3rd Generation Partnership Project; Technical Specification Group Radio Access Network; NR; Radio Resource Control (RRC) protocol specification (Release 17)", 3GPP TS 38.331, V17.5.0, Jun. 2023, pp. 1-1328.
Office action received for corresponding Chinese Patent Application No. 202180098574.5, dated Jul. 6, 2026, 13 pages of office action and 15 pages of translation available.
"Further issues on SL DRX", 3GPP TSG-RAN WG2 Meeting #116 Electronic, R2-2109812, Agenda: 8.15.2, Nokia, Nov. 1-12, 2021, 3 pages.

* cited by examiner

Operations of UE2

Potential actions of UE1

DECREASING LATENCY AND SAVING POWER IN SIDELINK COMMUNICATIONS

RELATED APPLICATION

This application was originally filed as a Patent Cooperation Treaty Application No. PCT/FI2021/050859 filed on Dec. 9, 2021, which claims priority of a FI national application Ser. No. 20/215,331 filed on Mar. 24, 2021, both of which are hereby incorporated in their entirety.

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

SUMMARY

According to a first aspect, there is provided an apparatus for a terminal, the apparatus comprising: means for applying a first discontinuous reception configuration for communications between the terminal and at least one other terminal, the first discontinuous reception configuration comprising at least one on-duration; means for determining whether to indicate the terminal is active in receiving outside the at least one on-duration; and means for, when it is determined to indicate the apparatus is active in receiving outside the on-duration, transmitting at least one indication to this effect to the one or more of the at least one other terminals.

The indication may comprise at least one further information from: a minimum time that the terminal will be active in receiving; an indication of a radio channel quality; and a resource indication.

The at least one further information may be provided implicitly in the indication.

The apparatus may comprise means for being configured with a second discontinuous reception configuration to be applied by the at least one other terminal for communications between the terminal and the at least one other terminal, wherein the indication is transmitted during a first time and/or frequency resource configured for the one or more of the at least one other terminals to receive a wake up signal as part of said second discontinuous reception configuration.

The apparatus may comprise means for being configured with a second discontinuous reception configuration to be applied by the at least one other terminal for communications between the terminal and the at least one other terminal, wherein the indication is transmitted during a second time and/or frequency resource that is independent of a first time period configured for the one or more of the at least one other terminals to receive a wake up signal as part of said second discontinuous reception configuration.

Said determining whether to indicate the terminal is active in receiving outside the on-duration to the one or more of the at least one other terminals may comprise determining that an active time of the terminal will be extended.

Said determining whether to indicate the terminal is active in receiving outside the on-duration to one or more of the at least one other terminals may comprise determining at least one of: a time difference between transmission of the indication and the next configured discontinuous reception on-duration; a time difference between transmission of the indication and an projected end of an active time of said receiving; and whether an upper layer of the terminal has predicted that the one or more of the at least one other terminals has information to transmit to the terminal.

The apparatus may comprise means for receiving a communication from the at least one other terminal outside of the at least one on-duration.

According to a second aspect, there is provided an apparatus for a terminal, the apparatus comprising: means for being configured with a first discontinuous reception configuration to be applied by at least one other terminal for communications between the terminal and the at least one other terminal, the first discontinuous reception configuration comprising at least one on-duration; means for receiving from one or more of the at least one other terminal an indication that said at least one other terminal is active in receiving outside said on-duration; and means for determining whether to make a transmission to the one or more of the at least one other terminals before the next configured discontinuous reception on-duration of the first discontinuous reception.

The indication may comprise at least one further information from: a minimum time that the one or more of the at least one other terminals will be active in receiving; an indication of a radio channel quality/condition; and a resource indication.

The at least one further information may be provided implicitly in the indication.

The apparatus may comprise means for transmitting data to the one or more of the at least one other terminals by using the further information.

The apparatus may comprise means for applying a second discontinuous reception configuration for communications between the terminal and the at least one other terminal, wherein the indication is received during a first time and/or frequency resource configured for the terminal to receive a wake up signal as part of said second discontinuous reception configuration.

The apparatus may comprise means for applying a second discontinuous reception configuration for communications between the terminal and the at least one other terminal; wherein the indication is received during a second time and/or frequency that is independent of a first time period configured for the terminal to receive a wake up signal as part of said second discontinuous reception configuration.

The apparatus may comprise means for determining to transmit data to the one or more of the at least one other terminals during an on-duration of the first discontinuous reception configuration.

According to a third aspect, there is provided an apparatus for a terminal, the apparatus comprising at least one processor; and at least one memory comprising code that, when executed by the at least one processor, causes the terminal to: apply a first discontinuous reception configuration for communications between the terminal and at least one other terminal, the first discontinuous reception configuration comprising at least one on-duration; determine whether to indicate the terminal is active in receiving outside the at least one on-duration; and when it is determined to indicate the apparatus is active in receiving outside the on-duration, transmit at least one indication to this effect to the one or more of the at least one other terminals.

The indication may comprise at least one further information from: a minimum time that the terminal will be active in receiving; an indication of a radio channel quality; and a resource indication.

The at least one further information may be provided implicitly in the indication.

The apparatus may be caused to be configured with a second discontinuous reception configuration to be applied by the at least one other terminal for communications between the terminal and the at least one other terminal, wherein the indication is transmitted during a first time and/or frequency resource configured for the one or more of the at least one other terminals to receive a wake up signal as part of said second discontinuous reception configuration.

The apparatus may be caused to be configured with a second discontinuous reception configuration to be applied by the at least one other terminal for communications between the terminal and the at least one other terminal, wherein the indication is transmitted during a second time and/or frequency resource that is independent of a first time period configured for the one or more of the at least one other terminals to receive a wake up signal as part of said second discontinuous reception configuration.

Said determining whether to indicate the terminal is active in receiving outside the on-duration to the one or more of the at least one other terminals may comprise determining that an active time of the terminal will be extended.

Said determining whether to indicate the terminal is active in receiving outside the on-duration to one or more of the at least one other terminals may comprise determining at least one of: a time difference between transmission of the indication and the next configured discontinuous reception on-duration; a time difference between transmission of the indication and an projected end of an active time of said receiving; and whether an upper layer of the terminal has predicted that the one or more of the at least one other terminals has information to transmit to the terminal.

The apparatus may be caused to receive a communication from the at least one other terminal outside of the at least one on-duration.

According to a fourth aspect, there is provided an apparatus for a terminal, the apparatus comprising at least one processor; and at least one memory comprising code that, when executed by the at least one processor, causes the terminal to: be configured with a first discontinuous reception configuration to be applied by at least one other terminal for communications between the terminal and the at least one other terminal, the first discontinuous reception configuration comprising at least one on-duration; receive from one or more of the at least one other terminal an indication that said at least one other terminal is active in receiving outside said on-duration; and determine whether to make a transmission to the one or more of the at least one other terminals before the next configured discontinuous reception on-duration of the first discontinuous reception.

The indication may comprise at least one further information from: a minimum time that the one or more of the at least one other terminal will be active in receiving; an indication of a radio channel quality/condition; and a resource indication.

The at least one further information may be provided implicitly in the indication.

The apparatus may be caused to transmit data to the one or more of the at least one other terminals by using the further information.

The apparatus may be caused to apply a second discontinuous reception configuration for communications between the terminal and the at least one other terminal, wherein the indication is received during a first time and/or frequency resource configured for the terminal to receive a wake up signal as part of said second discontinuous reception configuration.

The apparatus may be caused to apply a second discontinuous reception configuration for communications between the terminal and the at least one other terminal; wherein the indication is received during a second time and/or frequency that is independent of a first time period configured for the terminal to receive a wake up signal as part of said second discontinuous reception configuration.

The apparatus may be caused to determine to transmit data to the one or more of the at least one other terminals during an on-duration of the first discontinuous reception configuration.

According to a fifth aspect, there is provided a method for an apparatus for a terminal, the method comprising: applying a first discontinuous reception configuration for communications between the terminal and at least one other terminal, the first discontinuous reception configuration comprising at least one on-duration; determining whether to indicate the terminal is active in receiving outside the at least one on-duration; and, when it is determined to indicate the apparatus is active in receiving outside the on-duration, transmitting at least one indication to this effect to the one or more of the at least one other terminals.

The indication may comprise at least one further information from: a minimum time that the terminal will be active in receiving; an indication of a radio channel quality; and a resource indication.

The at least one further information may be provided implicitly in the indication.

The method may comprise being configured with a second discontinuous reception configuration to be applied by the at least one other terminal for communications between the terminal and the at least one other terminal, wherein the indication is transmitted during a first time and/or frequency resource configured for the one or more of the at least one other terminals to receive a wake up signal as part of said second discontinuous reception configuration.

The method may comprise being configured with a second discontinuous reception configuration to be applied by the at least one other terminal for communications between the terminal and the at least one other terminal, wherein the indication is transmitted during a second time and/or frequency resource that is independent of a first time period configured for the one or more of the at least one other terminals to receive a wake up signal as part of said second discontinuous reception configuration.

Said determining whether to indicate the terminal is active in receiving outside the on-duration to the one or more of the at least one other terminals may comprise determining that an active time of the terminal will be extended.

Said determining whether to indicate the terminal is active in receiving outside the on-duration to one or more of the at least one other terminals may comprise determining at least one of: a time difference between transmission of the indication and the next configured discontinuous reception on-duration; a time difference between transmission of the indication and an projected end of an active time of said receiving; and whether an upper layer of the terminal has predicted that the one or more of the at least one other terminals has information to transmit to the terminal.

The method may comprise receiving a communication from the at least one other terminal outside of the at least one on-duration.

According to a sixth aspect, there is provided a method for an apparatus for a terminal, the method comprising: being configured with a first discontinuous reception configuration to be applied by at least one other terminal for communications between the terminal and the at least one other terminal, the first discontinuous reception configuration comprising at least one on-duration; receiving from one or more of the at least one other terminal an indication that said at least one other terminal is active in receiving outside said on-duration; and determining whether to make a transmission to the one or more of the at least one other terminals before the next configured discontinuous reception on-duration of the first discontinuous reception.

The indication may comprise at least one further information from: a minimum time that the one or more of the at least one other terminal will be active in receiving; an indication of a radio channel quality/condition; and a resource indication.

The at least one further information may be provided implicitly in the indication.

The method may comprise transmitting data to the one or more of the at least one other terminals by using the further information.

The method may comprise applying a second discontinuous reception configuration for communications between the terminal and the at least one other terminal, wherein the indication is received during a first time and/or frequency resource configured for the terminal to receive a wake up signal as part of said second discontinuous reception configuration.

The method may comprise applying a second discontinuous reception configuration for communications between the terminal and the at least one other terminal; wherein the indication is received during a second time and/or frequency that is independent of a first time period configured for the terminal to receive a wake up signal as part of said second discontinuous reception configuration.

The method may comprise determining to transmit data to the one or more of the at least one other terminals during an on-duration of the first discontinuous reception configuration.

According to an seventh aspect, there is provided an apparatus for a terminal, the apparatus comprising: applying circuitry for applying a first discontinuous reception configuration for communications between the terminal and at least one other terminal, the first discontinuous reception configuration comprising at least one on-duration; determining circuitry for determining whether to indicate the terminal is active in receiving outside the at least one on-duration; and transmitting circuitry for, when it is determined to indicate the apparatus is active in receiving outside the on-duration, transmitting at least one indication to this effect to the one or more of the at least one other terminals.

The indication may comprise at least one further information from: a minimum time that the terminal will be active in receiving; an indication of a radio channel quality; and a resource indication.

The at least one further information may be provided implicitly in the indication.

The apparatus may comprise configuration circuitry for being configured with a second discontinuous reception configuration to be applied by the at least one other terminal for communications between the terminal and the at least one other terminal, wherein the indication is transmitted during a first time and/or frequency resource configured for the one or more of the at least one other terminals to receive a wake up signal as part of said second discontinuous reception configuration.

The apparatus may comprise configuration circuitry for being configured with a second discontinuous reception configuration to be applied by the at least one other terminal for communications between the terminal and the at least one other terminal, wherein the indication is transmitted during a second time and/or frequency resource that is independent of a first time period configured for the one or more of the at least one other terminals to receive a wake up signal as part of said second discontinuous reception configuration.

Said determining whether to indicate the terminal is active in receiving outside the on-duration to the one or more of the at least one other terminals may comprise determining that an active time of the terminal will be extended.

Said determining whether to indicate the terminal is active in receiving outside the on-duration to one or more of the at least one other terminals may comprise determining at least one of: a time difference between transmission of the indication and the next configured discontinuous reception on-duration; a time difference between transmission of the indication and an projected end of an active time of said receiving; and whether an upper layer of the terminal has predicted that the one or more of the at least one other terminals has information to transmit to the terminal.

The apparatus may comprise receiving circuitry for receiving a communication from the at least one other terminal outside of the at least one on-duration.

According to an eighth aspect, there is provided an apparatus for a terminal, the apparatus comprising: configuration circuitry for being configured with a first discontinuous reception configuration to be applied by at least one other terminal for communications between the terminal and the at least one other terminal, the first discontinuous reception configuration comprising at least one on-duration; receiving circuitry for receiving from one or more of the at least one other terminal an indication that said at least one other terminal is active in receiving outside said on-duration; and determining circuitry for determining whether to make a transmission to the one or more of the at least one other terminals before the next configured discontinuous reception on-duration of the first discontinuous reception.

The indication may comprise at least one further information from: a minimum time that the one or more of the at least one other terminal will be active in receiving; an indication of a radio channel quality/condition; and a resource indication.

The at least one further information may be provided implicitly in the indication.

The apparatus may comprise transmitting circuitry for transmitting data to the one or more of the at least one other terminals by using the further information.

The apparatus may comprise applying circuitry for applying a second discontinuous reception configuration for communications between the terminal and the at least one other terminal, wherein the indication is received during a first time and/or frequency resource configured for the terminal to receive a wake up signal as part of said second discontinuous reception configuration.

The apparatus may comprise applying circuitry for applying a second discontinuous reception configuration for communications between the terminal and the at least one other terminal; wherein the indication is received during a second time and/or frequency that is independent of a first time period configured for the terminal to receive a wake up signal as part of said second discontinuous reception configuration.

The apparatus may comprise determining circuitry for determining to transmit data to the one or more of the at least one other terminals during an on-duration of the first discontinuous reception configuration.

According to a ninth aspect, there is provided non-transitory computer readable medium comprising program instructions for causing an apparatus for a terminal to perform at least the following: apply a first discontinuous reception configuration for communications between the terminal and at least one other terminal, the first discontinuous reception configuration comprising at least one on-duration; determine whether to indicate the terminal is active in receiving outside the at least one on-duration; and when it is determined to indicate the apparatus is active in receiving outside the on-duration, transmit at least one indication to this effect to the one or more of the at least one other terminals.

The indication may comprise at least one further information from: a minimum time that the terminal will be active in receiving; an indication of a radio channel quality; and a resource indication.

The at least one further information may be provided implicitly in the indication.

The apparatus may be caused to be configured with a second discontinuous reception configuration to be applied by the at least one other terminal for communications between the terminal and the at least one other terminal, wherein the indication is transmitted during a first time and/or frequency resource configured for the one or more of the at least one other terminals to receive a wake up signal as part of said second discontinuous reception configuration.

The apparatus may be caused to be configured with a second discontinuous reception configuration to be applied by the at least one other terminal for communications between the terminal and the at least one other terminal, wherein the indication is transmitted during a second time and/or frequency resource that is independent of a first time period configured for the one or more of the at least one other terminals to receive a wake up signal as part of said second discontinuous reception configuration.

Said determining whether to indicate the terminal is active in receiving outside the on-duration to the one or more of the at least one other terminals may comprise determining that an active time of the terminal will be extended.

Said determining whether to indicate the terminal is active in receiving outside the on-duration to one or more of the at least one other terminals may comprise determining at least one of: a time difference between transmission of the indication and the next configured discontinuous reception on-duration; a time difference between transmission of the indication and an projected end of an active time of said receiving; and whether an upper layer of the terminal has predicted that the one or more of the at least one other terminals has information to transmit to the terminal.

The apparatus may be caused to receive a communication from the at least one other terminal outside of the at least one on-duration.

According to a tenth aspect, there is provided non-transitory computer readable medium comprising program instructions for causing an apparatus for a terminal to perform at least the following: be configured with a first discontinuous reception configuration to be applied by at least one other terminal for communications between the terminal and the at least one other terminal, the first discontinuous reception configuration comprising at least one on-duration; receive from one or more of the at least one other terminal an indication that said at least one other terminal is active in receiving outside said on-duration; and determine whether to make a transmission to the one or more of the at least one other terminals before the next configured discontinuous reception on-duration of the first discontinuous reception.

The indication may comprise at least one further information from: a minimum time that the one or more of the at least one other terminals will be active in receiving; an indication of a radio channel quality/condition; and a resource indication.

The at least one further information may be provided implicitly in the indication.

The apparatus may be caused to transmit data to the one or more of the at least one other terminals by using the further information.

The apparatus may be caused to apply a second discontinuous reception configuration for communications between the terminal and the at least one other terminal, wherein the indication is received during a first time and/or frequency resource configured for the terminal to receive a wake up signal as part of said second discontinuous reception configuration.

The apparatus may be caused to apply a second discontinuous reception configuration for communications between the terminal and the at least one other terminal; wherein the indication is received during a second time and/or frequency that is independent of a first time period configured for the terminal to receive a wake up signal as part of said second discontinuous reception configuration.

The apparatus may be caused to determine to transmit data to the one or more of the at least one other terminals during an on-duration of the first discontinuous reception configuration.

According to a sixteenth aspect, there is provided a computer program comprising program instructions for causing a computer to perform any method as described above.

According to an eleventh aspect, there is provided a computer program product stored on a medium that may cause an apparatus to perform any method as described herein.

According to a twelfth aspect, there is provided an electronic device that may comprise apparatus as described herein.

According to a thirteenth aspect, there is provided a chipset that may comprise an apparatus as described herein.

BRIEF DESCRIPTION OF FIGURES

Examples will now be described, by way of example only, with reference to the accompanying Figures in which.

DETAILED DESCRIPTION

In the following, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems with analogous components (for example, current 6G proposals).

Before explaining in detail the exemplifying embodiments, certain general principles of a 5G wireless communication system are briefly explained with reference to FIG. 1.

Figure 1:
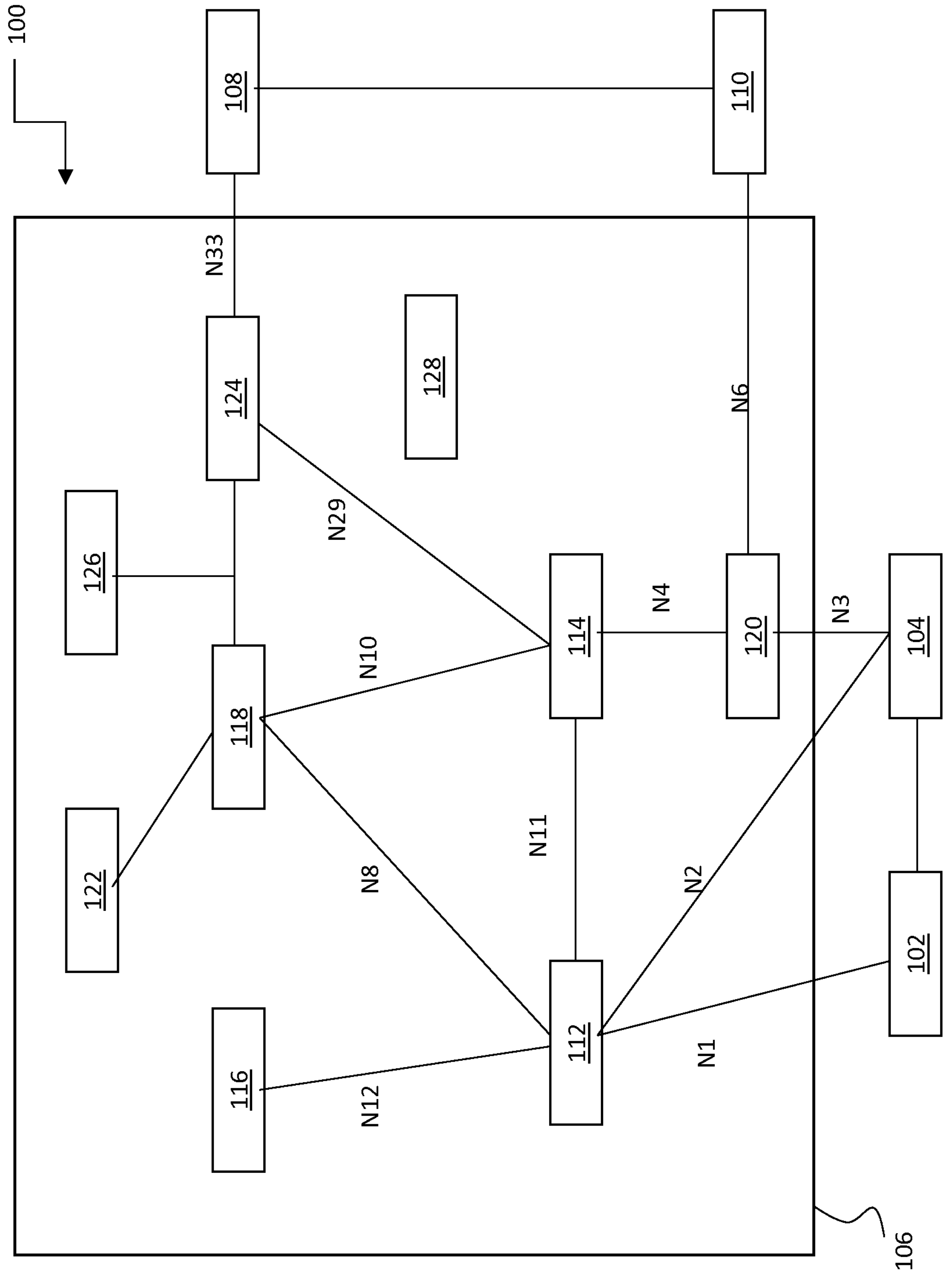
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

3GPP refers to a group of organizations that develop and release different standardized communication protocols. They are currently developing and publishing documents related to Release 16, relating to 5G technology, with Release 17 currently being scheduled for 2022.

3GPP specifications have previously considered transmissions directly between different user equipment/terminals (UEs). These transmissions are known as sidelink transmissions. An interface between the different UEs for sidelink transmissions is known as a PC5 interface. For clarity throughout the following, it is understood that "sidelink" communications refers to direct communications between UEs/terminals (i.e. communications made without transmission via an access point to a communications network). Moreover, references to a PC5 interface merely refers to an interface for effecting such sidelink communications, and is not intended to limit this interface to a specific form.

So far in Release 16, discontinuous reception (DRX) has not been considered for sidelink communication. DRX is a method used in communication systems to conserve the battery of a user equipment (UE). In particular, a UE and a network negotiates phases in which data transfer occurs in the interface between the UE and an access point (also referred to herein as a Uu interface). Phases in which a particular device receives data may be referred to as, for example, "on-duration" and/or "receive windows". During other times the UE powers down its receiving circuitry. This is usually a function designed into the protocol that allows this to happen, for example in slots with headers containing address details so that devices can listen to these headers in each slot to decide whether the transmission is relevant to them or not. In this case, the receiver only has to be active at the beginning of each slot to receive the header, conserving battery life.

With DRX not yet having been considered for application to sidelink communications, this means that a Release 16 sidelink receiver forming part of UE is always awake for monitoring and receiving information carried in the PC5 air interface. This leads to a high energy consumption, which limits the applicability of sidelink communication in power-constrained devices.

Since there has been no standardized sidelink DRX behavior so far, it is assumed that the Uu DRX configuration is taken as baseline. The Uu DRX configuration is a discontinuous reception configuration currently defined on the Uu interface, where a Uu interface connects a UE with an access point of the radio access network. In this configuration, a timer (labelled as the DRX-Inactivity Timer) can be configured in the UE by the network in order to extend the DRX on-duration at the UE when needed, for example, when the UE is to receive more data than its regular DRX receive window allows. This operation is illustrated with respect to FIG. 5.

Figure 5:
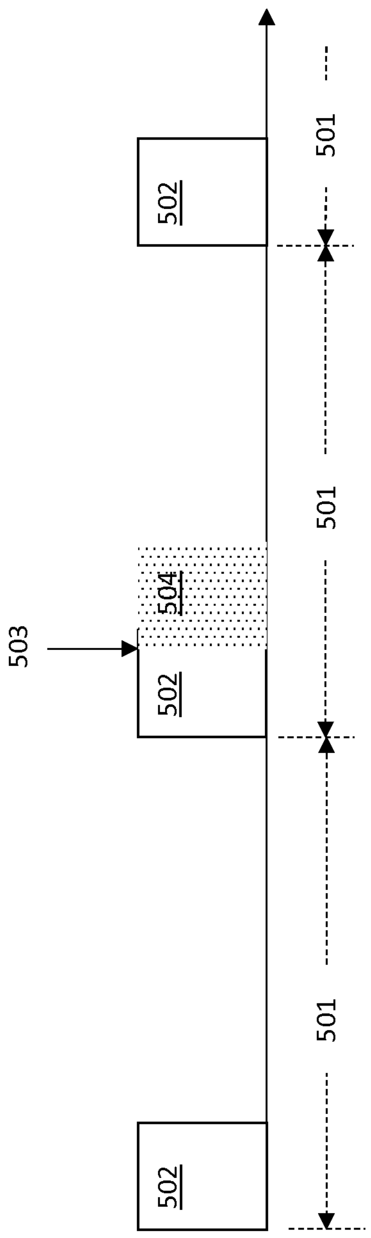
FIGS. 5 and 6 are example discontinuous reception configurations.

FIG. 5 shows the currently specified behaviour of a UE configured with Uu DRX with respect to the use of DRX-Inactivity Timer.

FIG. 5 shows the length of a DRX cycle 501. At the start of this DRX cycle 501, the UE is configured to be "on"/awake for monitoring communications on the relevant interface and/or channel for a specified duration 502 (also referred to as an "on-duration"). For example, the UE may be awake for monitoring the physical downlink control channel (PDCCH) only in the DRX on-duration during a DRX cycle and may sleep outside the on-Duration/receive window. During the second on-duration shown, the UE receives a communication 503 on the physical downlink control channel that configures the UE to extend its on-duration 502 by an additional time period 504. In the example of FIG. 5, this extended on-duration only lasts for a single DRX cycle, and so the subsequent "on" duration returns to its original configured duration.

If a UE does not detect a downlink control information (DCI) addressing a scheduling grant to itself during the DRX on-duration, the UE can go to sleep. In this case, the UE wakes up and monitors the PDCCH again during the next DRX on-duration at the next DRX cycle. In contrast, if a Downlink Control Information (DCI) addressed to the UE is received during the DRX on-duration, the UE (re-)starts its DRX-InactivityTimer and continues to monitor the PDCCH. When the DRX-Inactivity Timer is running, the UE is mandated to monitor PDCCH and cannot go to sleep.

Consequently, in this operation, the UE performs the following behaviors:

Whenever a new DCI is received during the running of DRX-Inactivity Timer, the UE resets its DRX-InactivityTimer to zero and restarts it.

When the DRX-InactivityTimer expires, the UE can go to sleep again until the next scheduled DRX on-duration. Subsequently, the above-described procedure repeats.

The DRX-InactivityTimer may thus be used to extend the UE's wakeup time when there is any data to be transmitted from network to the UE.

This scheme can be extended to apply to at least receiving sidelink unicast transmissions, e.g. to extend the Rx UE's wakeup time for monitoring the sidelink interface when there is still data to be transmitted from the sidelink transmitter to the sidelink receiver.

There exist other schemes to help a UE save power during DRX operation.

For example, in the context of narrowband (NB) Internet of Things (IoT) communications in LTE, the concept of a machine-type-communication Wake-up signal (MWUS) was introduced. This MWUS is used to trigger the wake up of a UE operating using machine-type-communications (MTC). In practice, this is achieved by introducing a Zadoff-Chu signal (sequence) in specific time and frequency resources, while configuring the MTC/NB-IOT UE to monitor these specific time and frequency using a simple (i.e. very low complexity) receiver when the UE is in a Radio Resource Control (RRC) idle state. In case the MWUS is detected during this monitoring, then the simple receiver triggers the full NB-IOT receiver to wake up and to monitor for a paging message during the UE's next paging occasion (s).

As another example, a Physical Downlink Control Channel (PDCCH)-based power saving signal/channel was defined in the context of New Radio (NR) with the goal to instruct a UE in an RRC Connected mode to wake up at the next DRX On-Duration. This signal was defined as "DCI with CRC scrambled by PS-RNTI", also called DCP, where PS stands for Power Saving, CRC for cyclic redundancy check, and the used Downlink Control Information (DCI) format is 2_6 according to current specifications.

In this example, when a UE does not receive the DCP signal during the network-defined wakeup signal (WUS) occasion(s) or when a received DCP does not contain a wake-up indication, the UE assumes that there is no data to be received during the next DRX on-duration and can skip monitoring the PDCCH during the next DRX on-duration. Thus, power saving is achieved when no data is present. To minimize false alarms that lead to waking up a UE unnecessarily, the DCP signal is targeted to a specific UE using a UE specific identifier. In the specification, this specific identifier is labelled as the Power Saving Radio Network Temporary Identifier (PS-RNTI).

Figure 6:
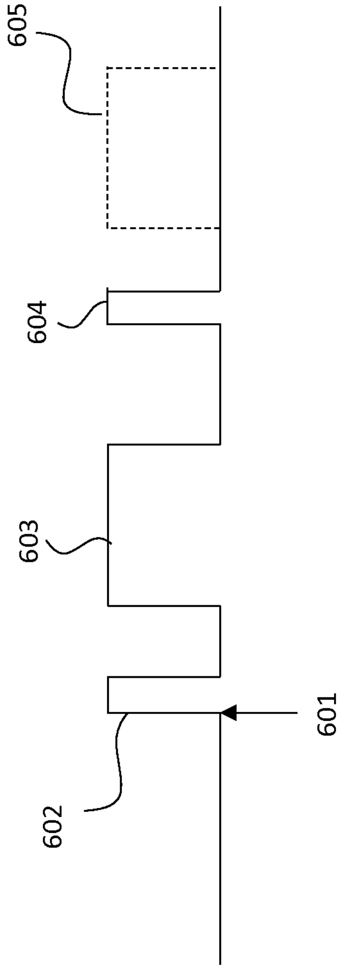

This example is further illustrated with respect to FIG. 6.

FIG. 6 illustrates transitions made by a UE from a non-monitoring state to a monitoring state.

During a first time, the UE is not monitoring the PDCCH. At 601, the UE is scheduled to check for/receive a DCP signal 602. When a DCP signal directed towards the UE is received in this duration of 601, this causes the UE to perform wakeup at 603 in which it actively monitors the PDCCH for downlink allocations to the UE. At 604, the UE receives a DCP signal that does not indicate that the UE should monitor the PDCCH during an on-duration monitoring period, or does not receive a DCP signal at all. Consequently, at 605 the UE remains in an "off" duration state and so does not wakeup to monitor the PDCCH.

Other signals than the above-mentioned DCP signal may be used to cause the UE to wakeup from a reduced power mode (such as an idle mode). For example, a paging early indication (PEI) is currently being designed to instruct UEs in RRC Idle/Inactive to whether to monitor for paging in their paging occasion. Such a signal may likewise be used to indicate when a UE should perform further receiving actions/increase power consumption for receiving data.

There are several scenarios in which problems using the above-described mechanisms may arise.

For example, consider a scenario in which a first UE, UE1, communicates with a second UE, UE2, in sidelink unicast. This is described in relation to FIG. 7.

Figure 7:
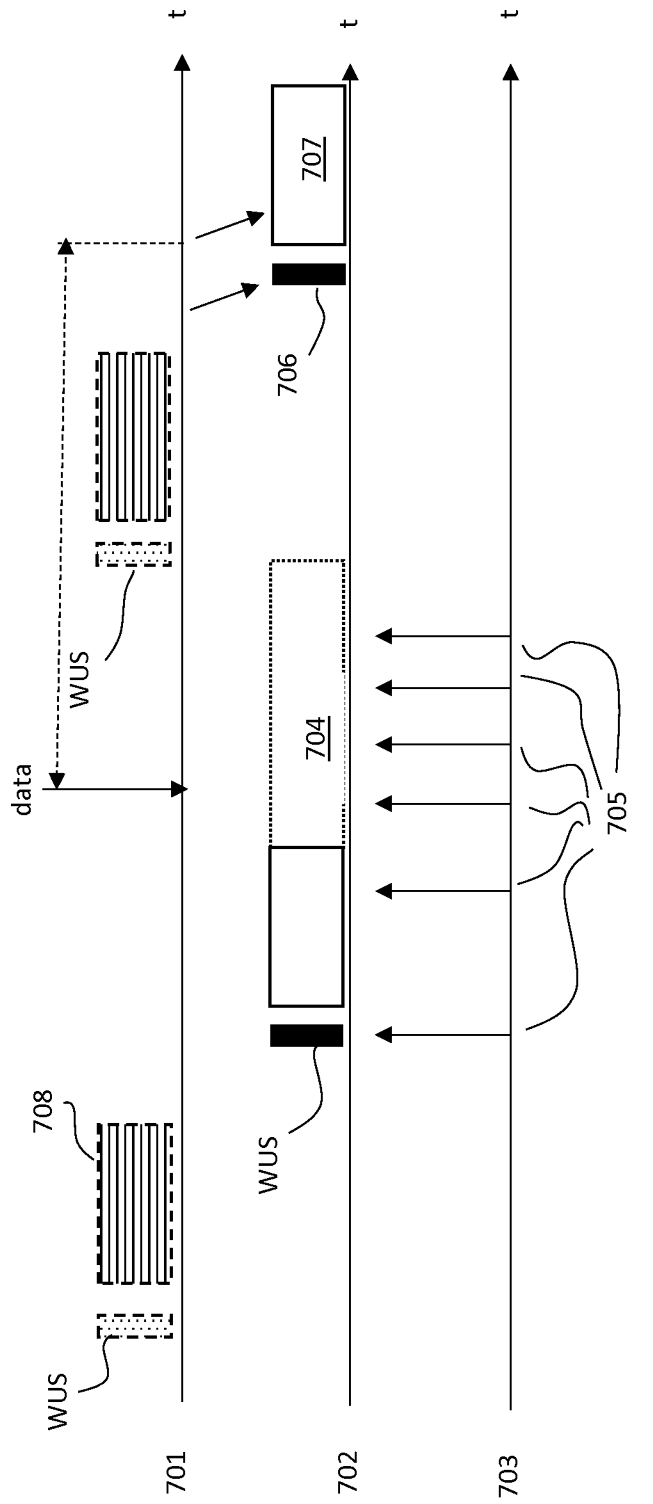
FIGS. 7 and 8 are example operations of multiple terminals relative to their discontinuous reception configurations.

FIG. 7 illustrates the transitions of UE1 701 between a lower power mode and a higher power mode, the transitions of a UE2 702 between a lower power mode and a higher power mode, and transmissions made by each of UE1, UE2, and a third UE, UE3, 703.

In the example of FIG. 7, it is assumed that the initial sidelink DRX configuration coordination between UE1 and UE2 has been performed, e.g. by the network, pre-configuration or by signaling exchange between UE1 and UE2 (e.g. by using the currently defined PC5-S/RRC procedure to exchange the sidelink DRX configuration that should be applied during the unicast communications between UE1 and UE2). With UE1 and UE2 being configured with their own WUS and/or on-duration timings and being aware of the WUS and/or on-duration timings of the other peer apparatus, both UE1 and UE2 are configured to locate the position in time of the WUS occasions that each UE will monitor.

In FIG. 7, certain time occasions are configured for the monitoring of a sidelink WUS that precedes the actual sidelink DRX ON-duration of a UE in a similar manner to the Uu interface case and NB-IOT receiver case discussed above.

Therefore, a transmitting UE (e.g. UE2) in FIG. 7 may transmit a sidelink WUS prior to the start of the sidelink DRX ON-duration of its intended receiver (e.g. UE1). This allows the intended receiver to know (based on the detection of the sidelink WUS), whether or not it should wake up to monitor the upcoming sidelink DRX ON-duration. In one example, if UE1 does not receive a WUS intended for UE1 in its WUS occasion(s), it may not monitor the corresponding sidelink DRX.

Further, the sidelink transmissions for UE1 and UE2 are not shown as overlapping in the example of FIG. 7. This is useful when UE1 and UE2 receive sidelink transmissions associated with different services/links. For instance, UE1 may prefer to utilize the same sidelink DRX ON-duration for receiving both from its unicast peers (e.g. UE2) as well as from its other broadcast/groupcast services, so does UE2. Thus, if UE1 and UE2 are interested in receiving different broadcast/groupcast services with different sidelink DRX configurations, their sidelink DRX ON-duration may be different. This is shown in FIG. 7.

In FIG. 7, a first WUS signal for UE1 does not indicate that UE1 should wakeup to receive sidelink communications. Therefore the UE1 does not wakeup on this occasion during 708. A first WUS signal for UE2 (at a non-overlapping time to the first WUS of UE1) results in the UE2 receiving a WUS from UE 3. Therefore, at 704 UE2 enters a monitoring state for receiving communications from UE3. UE3 subsequently transmits data 705 causing the monitoring state 704 of UE2 to be extended in order to continue to receive this data. This may be performed using a timer, such as a sidelink DRX-InactivityTimer. This can be extended and/or re-started as many times depending on the level of data activity of the receiver's associated transmitters during the receiver's DRX active time.

While the monitoring state 704 of UE2 is being extended, UE1 receives and/or generates data for transmission to UE2. However, as a result of the extended monitoring state 704, a wakeup signal to UE2 cannot be transmitted until 706, with the actual data being transmitted during 707. The length of time between the receipt/generation, by UE1, of the data for UE2 and the transmission of the data to UE2 is known as the latency.

In this example, UE1 will not know that UE2 is awake, e.g. that the UE2's wakeup time has been extended. Therefore, if UE1 generates a new data to be transmitted to UE2 at the next known available time instance, then UE1 will have to wait until the next sidelink DRX ON duration on UE2 to transmit the data to UE2, inducing unnecessary latency in such transmission.

A straightforward way to address this latency issue would be to use an optimized DRX configuration with, for example, shorter values of the DRX cycles and On-Duration. This may allow for a better tradeoff between latency and UE power, allowing a UE to wake up more often to check if data is present. However, a short sidelink DRX on-duration may not always be efficient in sidelink communications. This is due to the fact that the transmitting UE cannot ensure there will be an available/suitable transmission resource in the short DRX on-duration. For example, a reduced sidelink DRX on-duration, may lead to a higher chance that all the transmission resources in the sidelink DRX on-duration are sensed as occupied. In another example, since the receiving UE may monitor PC5 during its sidelink DRX On-duration to receive from multiple sidelink Tx UEs, the different transmissions from different sidelink Tx UEs may also collide if a short sidelink DRX On-duration is used. This may lead to a deterioration in communication reliability. As another example, a frequent switch between active state and inactive state at the Rx UE in the mentioned alternative may also cause additional power consumption.

The following aims to address at least one of the above-mentioned issues to avoid/reduce the occurrence of these unnecessary latency penalties.

As identified above, a transmitting sidelink UE is not necessarily aware of whether a target receiver sidelink UE is awake and ready for data reception. Specifically, the transmitting UE is not aware of the awake periods outside the target receiver's "scheduled/configured" sidelink DRX on-duration, during which the target receiver is monitoring for data (e.g. awake and active time extensions when sidelink DRX-InactivityTimer is running). Without this knowledge, a transmitting UE will have to always defer its data transmission until the next sidelink DRX on-duration of the target receiver. The main drawback of this behaviour is that unnecessary latency will be introduced if the target receiver was anyway already awake and ready for data reception, e.g. due to communication with another UE.

The following introduces an indication that can be sent by a sidelink UE to other sidelink UE(s) to indicate it is currently and/or scheduled to receiving communications outside of its regularly scheduled DRX on-duration/receive window. In other words, using the apparatus labels introduced in FIG. 7, an indication may be transmitted from UE2 to UE1 that indicates that UE2 is awake outside UE2s scheduled on-duration and, thus, available for data reception. UE1 can send data to UE2 after receiving the indication, and thus without waiting for the next On-Duration of UE2. The data transmission from UE1 to UE2 that is triggered by a received indication may take place within a certain time window after receiving the indication.

Furthermore, in order to reduce the costs associated with the indication in terms of power and resources consumption, the indication may be transmitted only when the latency benefit is deemed to be significant, and/or, when a single indication transmitted by a UE can be received by multiple UEs. Therefore, UE2 may make some determination as to whether or not to transmit the indication using a cost-benefit analysis for the present system. As the indication is sent only when a receiver is awake (and possibly only when UE2 determines that such an indication would be useful to the recipient), the indication may be considered to be transmitted ad hoc.

Figure 8:
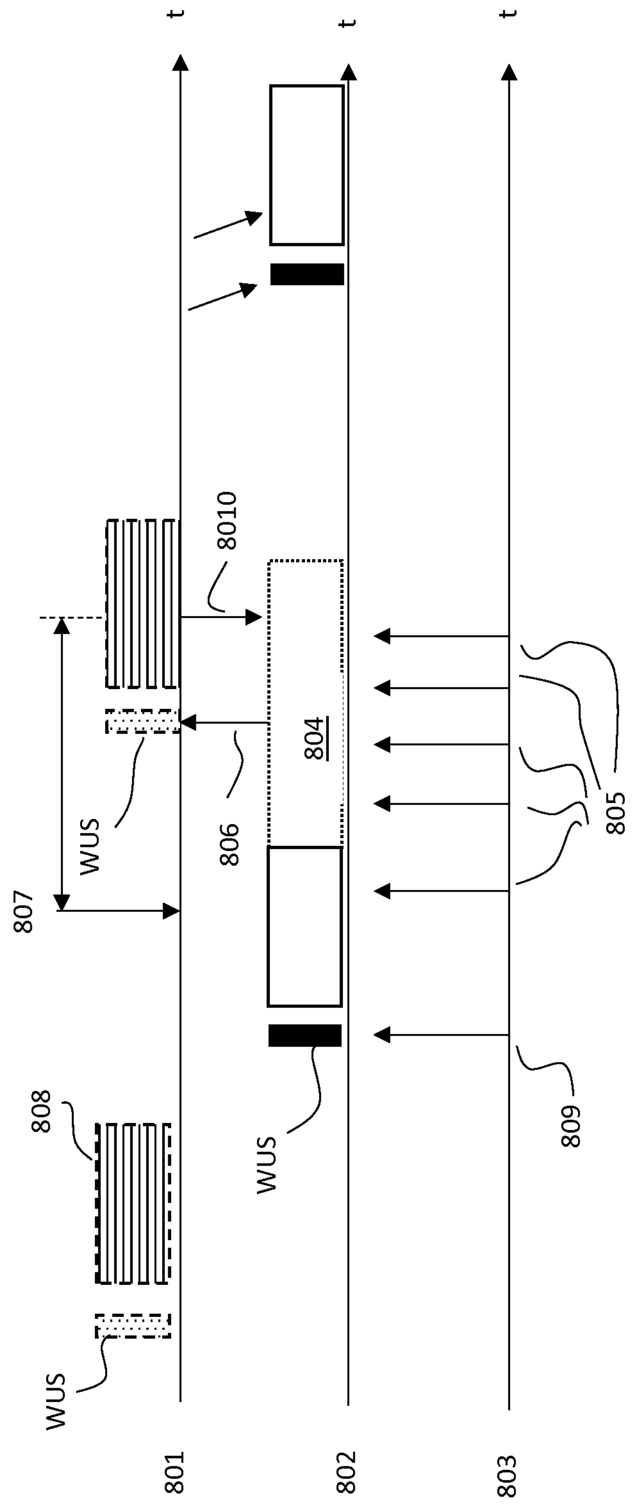

This is illustrated with respect to FIG. 8, which shows the presently described system relative to the system of FIG. 7. Throughout this following and the subsequent description, the entity that receives the indication will be referred to as UE1, and the entity that transmits the indication will be referred to as UE2. This is for purposes of clarity, and it is understood both that each role may be performed by the other apparatus/UE, and that other (not shown) UEs may participate in the same or similar roles.

FIG. 8 illustrates the transitions of UE1 801 between a lower power mode and a higher mode, the transitions of a UE2 802 between a lower power mode and a higher power mode, and transmissions made by each of UE1, UE2, and a third UE, UE3 803.

In FIG. 8, a first WUS signal for UE1 does not indicate that UE1 should wakeup to receive sidelink communications. Therefore the UE1 does not wakeup on this occasion at 808. A first WUS signal for UE2 (at a non-overlapping time to the first WUS of UE1) results in the UE2 receiving a WUS 809 from UE3. Therefore, at 804 UE2 enters a monitoring state for receiving communications from UE3. The monitoring state may be referred to as an active time of UE2 as UE2 has a powered up receiving state relative to the other times of UE2's operation. During the active time, UE2 may receive communications from at least one other terminal. UE3 subsequently transmits data 805 causing the monitoring state 804 of UE2 to be extended in order to continue to receive this data. This may be performed using a timer, such as a sidelink DRX-InactivityTimer. This timer may be extended and/or re-started as many times as necessary for receiving data. The duration of the extension thus depends on the level of data activity of the receiver's associated transmitters during the receiver's DRX active time.

UE2 is configured with the discontinuous reception configuration applied by UE1. UE2 is therefore configured with information regarding when UE1 monitors for an indication signal. Consequently, during that period, when UE2 is awake, e.g. UE2 has an (extended) monitoring state 804, UE2 sends an indication 806 to UE1 that informs UE1 that UE2 is in the (extended) monitoring state 804. In FIG. 8, it is noted that the time resource when UE1 monitors for the potential indication from UE2 overlaps with the time resource used by UE1 to monitor a wakeup signal from UE2, However, it does not restrict other configurations where the time resources for monitoring the potential indication signal and the potential wakeup signal are note overlapping.

As UE1 received and/or generated data for transmission to UE2 at 807 (which is prior to receipt of the indication sent by UE2), UE1 sends the received and/or generated data to UE2 at 8010. Therefore, the latency according to the system of FIG. 8 is reduced relative to that of FIG. 7.

Aspects of the following may apply in respect of the example of FIG. 8, as well as other example systems described herein in respect of FIGS. 9 to 15.

UE1 and UE2 are configured with at least one indication configuration for monitoring for an indication from the other UE and/or at least one indication configuration for transmitting an indication to the other UE. The indication configuration may comprise at least the time-frequency resource (s) for indication transmission/monitoring, such that transmission and/or monitoring for the indication happens in the time-frequency resource(s).

The transmission of the indication can occur at any time, depending on the timer running (e.g. the DRX OnDurationTimer running, or the sidelink DRX InactivityTimer running). In contrast, the time spent monitoring for the indication may be specific to the indication monitoring/transmitting UE, which has to be exchanged with the sidelink peer UE(s). Consequently, the time domain resources for indication transmission and indication monitoring may be associated with the sidelink DRX On-duration of the indication monitoring UE. In other words, the association may be configured as a timing offset and/or a time-window with respect to the starting of the sidelink DRX On-duration of the indication monitoring UE.

As one example, occasion(s) for transmitting the indication may be configured to occur just prior to, just after, or at least partially overlapping the time for monitoring for the WUS in the time domain. The indication may be transmitted in a sequence or a sidelink control information-like WUS, such as, for example, DCP, and is configured with the same time and/or frequency resource(s) as for WUS (DCP). In other words, the configured offset/time-window may be the same as configured for WUS (DCP).

Multiple peer user equipments of UE2 may be configured with the same indication resource(s) for monitoring for an indication from UE2. In particular, when the multiple peer UEs have the same start time for their respective sidelink DRX On-durations, their indication resource(s) may be overlapping. Multiple peer UEs of UE2 (which made include UE1) may thus be configured with the same indication time resources to monitor. This configuration may be performed by, for example, UE2 and/or by a network apparatus, such as an access point. In this case, the indication resource(s) may not be associated with the sidelink DRX configuration of the multiple peer UEs.

The indication configuration may include information on whether the indication should indicate further information. For example, the indication may indicate a minimum and/or maximum time that UE2 will be awake/configured to receive transmissions for after transmitting the indication. As another example, the indication may indicate a channel radio condition for the sidelink channel. This may assist the receiving UE1 in adapting transmission parameters for transmitting the received/generated data to UE2. One way in which a channel radio condition may be indicated is by providing a CBR measured by UE2. As a further example, the indication may indicate a time—and/or—frequency resource that can be used or taken account by UE1 to transmit, e.g. the received/generated data, to UE2.

Any of these types of further information may be provided explicitly. In the case of the further information being provided explicitly in the indication, the transmitted indication may explicitly carry the indicated information.

Any of these types of further information may be provided implicitly. In the case of the further information being provided implicitly, there may be multiple indication configurations configured or defined (e.g. in an operating specification), where each indication configuration indicates the corresponding information. In this case, UE2 may determine/select the proper indication configuration used for transmitting indication based on UE2's real-time condition. The indication configuration(s) may be configured by network, UE-implementation/pre-configuration, technical specification, and/or coordination between UE1 and UE2, e.g. by using PC5-RRC message and/or sidelink MAC control element (CE).

Some of the further information may be provided explicitly while other of the further information may be provided implicitly. What further information is provided implicitly and what further information is provided explicitly may be defined as part of the indication configuration.

UE2 may determine to send an indication to UE1 during UE1's configured indication resource to indicate that UE2 is awake to monitor and receive data from the sidelink interface after the indication transmission. UE2 may determine to send an indication to one or more UEs (e.g. UE1) whenever UE2 is in Active Time outside its ON-Duration known by the one or more UEs (e.g. UE1) due to ongoing communication operations with other sidelink UEs (e.g., UE3). In one example, UE2 may be in the Active Time due to the running sidelink DRX-InactivityTimer. In another example, UE2 may be awake in a DRX On-Duration known by UE3 for the transmission from UE3 to UE2, but unknown by UE1, i.e. UE3 and UE1 are configured with different sidelink DRX to transmit to UE2.

Alternatively or additionally, UE2 may have the flexibility to decide whether an indication should be transmitted to UE1 or not, in order to minimize the associated power and resource costs.

For example, UE2 may decide to send indication in a configured indication resource when the time difference between the indication resource and the next UE1's sidelink DRX ON-Duration is above a defined threshold. Thus, UE2 sends indication only if the potential latency benefit is significant, and/or if the introduced latency from waiting to the next sidelink DRX On-Duration would be above the latency target.

As another example, UE2 may decide to send an indication when UE2 would be awake for a time window larger than a configured threshold after the indication is sent. This increases the likelihood that UE1 would have data to transmit to UE2 during the window, as well as ensuring that UE1 is able to find an available sidelink resource.

As another example, UE2 may decide to send an indication when UE2 determines that UE1 may likely have data to transmit to UE2. For instance, after UE2 receives a broadcasted and/or multi-casted transmission from UE3, UE2 may analyze the data received from UE3 to check if UE3's transmission would cause UE1 to transmit to UE2. This analysis may be performed at an upper layer, e.g. an application layer and/or a non-access stratum layer of UE2. This approach may particularly apply in case that UE1, UE2, and UE3 have formed a group (e.g. at the application layer), since a transmission from UE3 to the group may cause a follow-up communication between/among different group members.

UE1 may determine whether to monitor for the indication or to skip its indication monitoring for UE2. This may be determined in dependence on at least one condition. For example, UE1 may determine to skip its indication monitoring when at least one of the following conditions occurs:

When no data is expected for transmitting to the UE2 after the indication occasion;

When the same indication monitoring configuration is configured for multiple peer UEs of UE2; and/or When the indication occasion is not associated with the sidelink DRX On-duration of UE1.

If there is data to be transmitted to UE2, after UE1 receives the indication from UE2, the UE1 may start transmitting its data to UE2, without waiting for the next sidelink DRX ON-duration of UE2. The transmission from UE1 to UE2 may use and/or follow any restrictions indicated and/or comprised in the received indication. For example, UE1 may transmit to UE2 within certain time internal/pattern after receiving the indication. As another example, UE1 may transmit to UE2 in certain resource pool(s) or certain resources within the resource pool(s). The term "resources" here indicates specific time and frequency combinations.

In this manner, the indication transmitted by UE2 enables UE2 to indicate to UE1 that UE2 is awake to receive data from UE1. Afterwards, UE1 can transmit its data to UE2 immediately, which reduces the latency compared to the baseline scheme illustrated with respect to FIG. 7. In addition, since the same time occasion can be used for UE1 to receive indication and WUS, the proposed indication transmission does not require UE1 to be awake longer than the considered baseline sidelink DRX scheme, which provides a good power efficiency at the indication monitoring/receiving UE (UE1). This proposed mechanism may be considered as complementary to the WUS design described in above. The proposed indication from UE2 is not intended to wake up the receiving UE (UE1) for monitoring communications on PC5, but instead it is for the indication transmitting UE (UE2) to indicate to UE1 that UE2 is awake.

Figure 9:
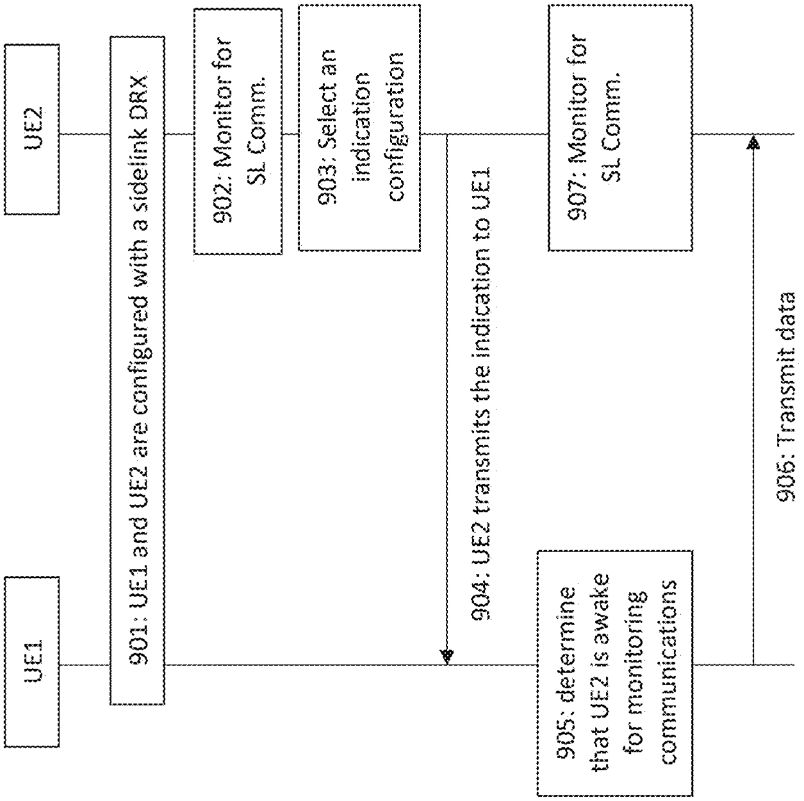
FIG. 9 is an example signaling diagram between terminals.

FIG. 9 is a signalling diagram between UE1 and UE2 that illustrates potential signalling between these two different entities when the WUS and the indication are scheduled for at least some of the same transmission resources.

At 901, both UE1 and UE2 are configured with a sidelink DRX configuration for discontinuous reception on a direct connection between UE1 and UE2. This configuration comprises an indication configuration for communication between UE1 and UE2, as described above.

For example, the indication configuration may comprise an identification of the indication that will be transmitted, the indication resources, and/or the associated indication.

The indication resources may refer to periodic time—and/or—frequency domain resource(s), where an indication can be transmitted to UE1. Additionally, the indication resources may further refer to a code domain resource(s).

There may be one or multiple indication configurations, where each indication configuration has a different time—and/or—frequency resource, a different cyclic shift, and/or a different content in the information element carried in the indication.

Moreover, an indication configuration may associate to a specific configuration/restriction/indication. For example, the transmitted indication using the indication configuration may implicitly indicate that the data transmission from UE1 to UE2 should take place within certain time internal/pattern after receiving the indication. Thus, based on the communication activity at UE2, UE2 may select a proper indication configuration. For example, if UE2 is involved in the sidelink communications with a large amount of peer UEs, UE2 may likely be awake for a long time. In this case, UE2 may select an indication configuration where the transmitted indication indicates a long wakeup time of UE2 and, accordingly, the data transmission from UE1 to UE2 can happen during a long time interval. As another example, the indication configuration may associate to certain resource pool(s). For example, UE2 may select a best resource pool with the lowest channel busy ratio (CBR) measurement, and select and send an indication that indicates the selected resource pool to UE1. Thus, based on the received indication, UE1 may decide the best resource pool measured by UE2 and use that resource pool to transmit data to UE2. This may enhance the data transmission reliability.

Different indication configurations may be used to indicate different sidelink channel radio conditions. This may assist UE1 for adapting its transmission towards at least UE2. In one example, since UE1 may sleep until the beginning of the upcoming sidelink DRX ON-duration, its CBR measurement may not be available at the beginning of the sidelink DRX ON-duration. Thus, UE2 may select and send an indication to indicate its measured CBR, which can be used by UE1 to adjust its transmission parameters, e.g. to select a proper modulation and coding scheme (MCS), and/or to perform a certain number of blind retransmissions/repetitions to improve the transmission reliability towards at least UE2.

The configuration may be performed in a number of different ways.

As a first example, the configuration may be performed by coordination between UE1 and UE2. For example, UE1 may indicate the indication configuration(s) to UE2. Alternatively, UE2 may also indicate/recommend the indication configuration(s) to be used to UE1, such that UE1 considers the indicated configuration to receive an indication. This approach allows UE2 to coordinate multiple of its peer UEs (e.g. including UE1), such that the multiple peer UEs of UE2 can have the same indication occasion. In this case, UE2 may multicast an indication to multiple peer UEs, to save its power consumption for transmitting the indication to multiple peer UEs. In case there is a configuration collision detected by one UE during the coordination procedure, the UE may indicate the collision to its peer UE in order to resolve the collision.

As a second example, which may be used additionally or alternatively to the first example, the configuration may use information provided by the network (e.g. via dedicated signaling or system information block (SIB), UE-implementation or UE-(pre)configuration, and via the Technical specification defining the communication between the different entities.

At 902, UE2 determines that UE2 will monitor the interface for sidelink communications (e.g. direct communications with another (peer) UE).

The determination may be performed right before the UE1's next indication occasion, e.g. by taking account of the UE processing time. As one example, the determination may be based on the fact that UE2 will have other active communication task with a third sidelink UE after the next indication occasion.

At 903, UE2 selects an indication configuration for transmitting the above-mentioned indication to UE1. This selection may be performed e.g. based on its sidelink communication activity and/or the measured sidelink radio condition, as previously. This step may be optional.

At 904, UE2 transmits the indication to UE1.

At 905, in response to receipt of the indication transmitted in 904, UE1 determines that UE2 is awake for monitoring communications on the direct link between UE1 and UE2. UE1 may determine if there is data in its buffer to be transmitted to UE2 and/or whether there will imminently be data in its buffer. UE1 may also, where applicable, determine further information from the received indication of UE2, as described above. In other words, UE1 may further determine the additional implicit and/or explicit information indicated in the received indication.

At 906, when there is data in UE1's buffer to transmit and/or UE1 generates data for transmission to UE2, UE1 transmits said data to UE2 before the next scheduled sidelink discontinuous reception for UE2. The transmission may further take account of the determined indication/information in step 905. Thus, UE1 does not need to wake until the next sidelink DRX ON-duration of UE2 as UE1 transmits the data directly after receiving the indication During 905 and 906, UE2 monitors (and receives) communications on the sidelink between UE2 and peer UEs (represented by 907 in FIG. 9). UE1 may be considered to be a peer UE. The monitoring may be constrained by the configuration/restriction of the transmitted indication, in order to successfully receive the potential future data transmission from UE1. In case another sidelink peer UE of UE2 has the same indication resource as UE1, UE2 may multicast one indication to the multiple peer UEs including UE1. Thus, the multiple peer UEs may behave as UE1 in the steps 905 and 906.

Different occasions/time instances can be used for the indication and the WUS. This allows for flexibility for using indication.

As one example, the indication resources may have a smaller periodicity comparing to the WUS resources. In this case, UE1 may have more frequent occasions to receive an indication from UE2, such that the latency due to applying sidelink DRX can be further reduced.

In an additional example, the indication occasions for UE2 to transmit indication to UE1 may closely follow the WUS occasions for UE2 to receive an WUS. In this case, since UE2 may know that another UE (e.g. UE3) is transmitting to UE2 by receiving the WUS over its own WUS occasion, UE2 knows that it needs to monitor the following sidelink DRX ON-duration. Thus, sending an indication from UE2 to UE1 may indicate to UE1 that UE2 will monitor the following sidelink DRX ON-duration. In this case, if there is any data buffered at UE1, UE1 may proceed to transmit the buffered data to UE2 after receiving the indication.

Figure 10:
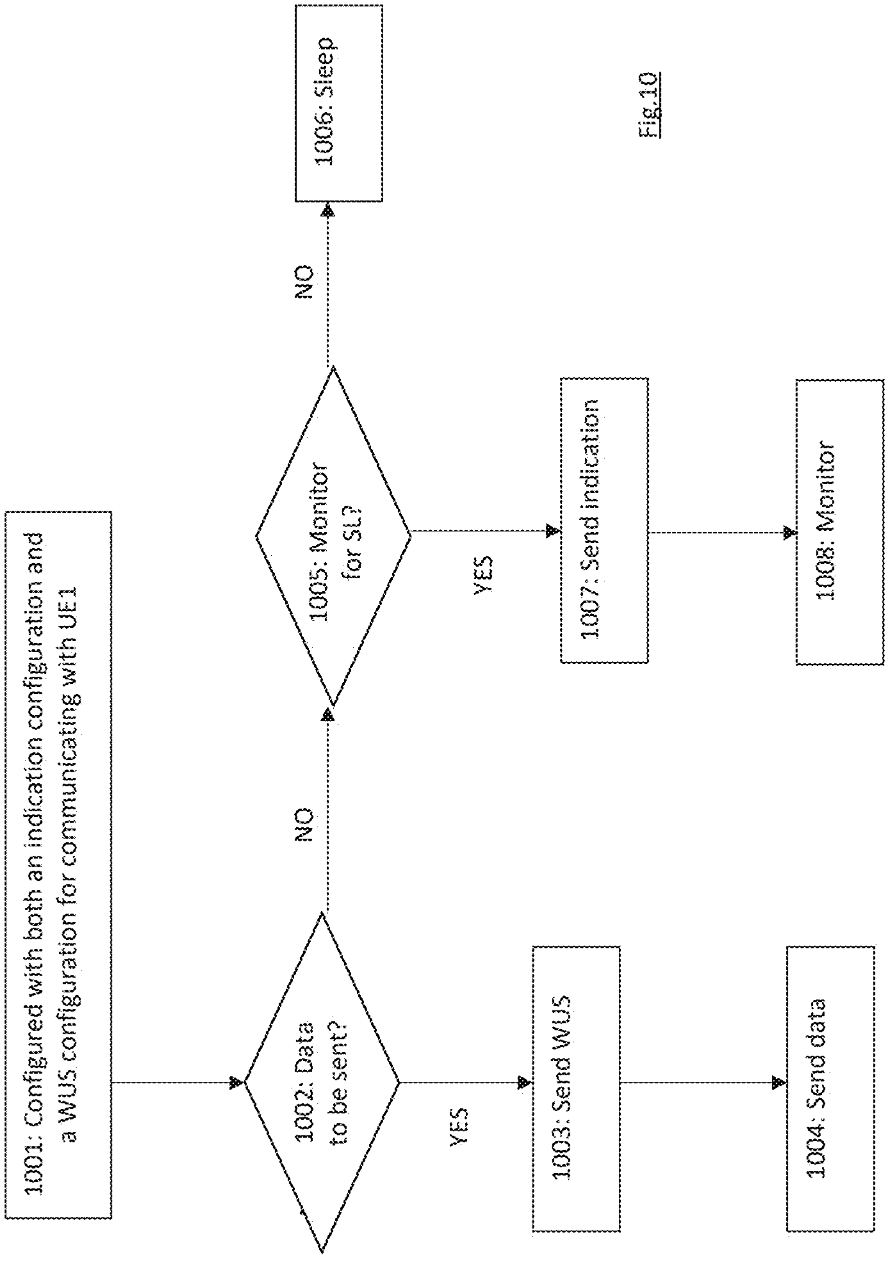
FIGS. 10 to 13 are example flow charts illustrating potential operations performed by respective apparatuses.
Figure 11:
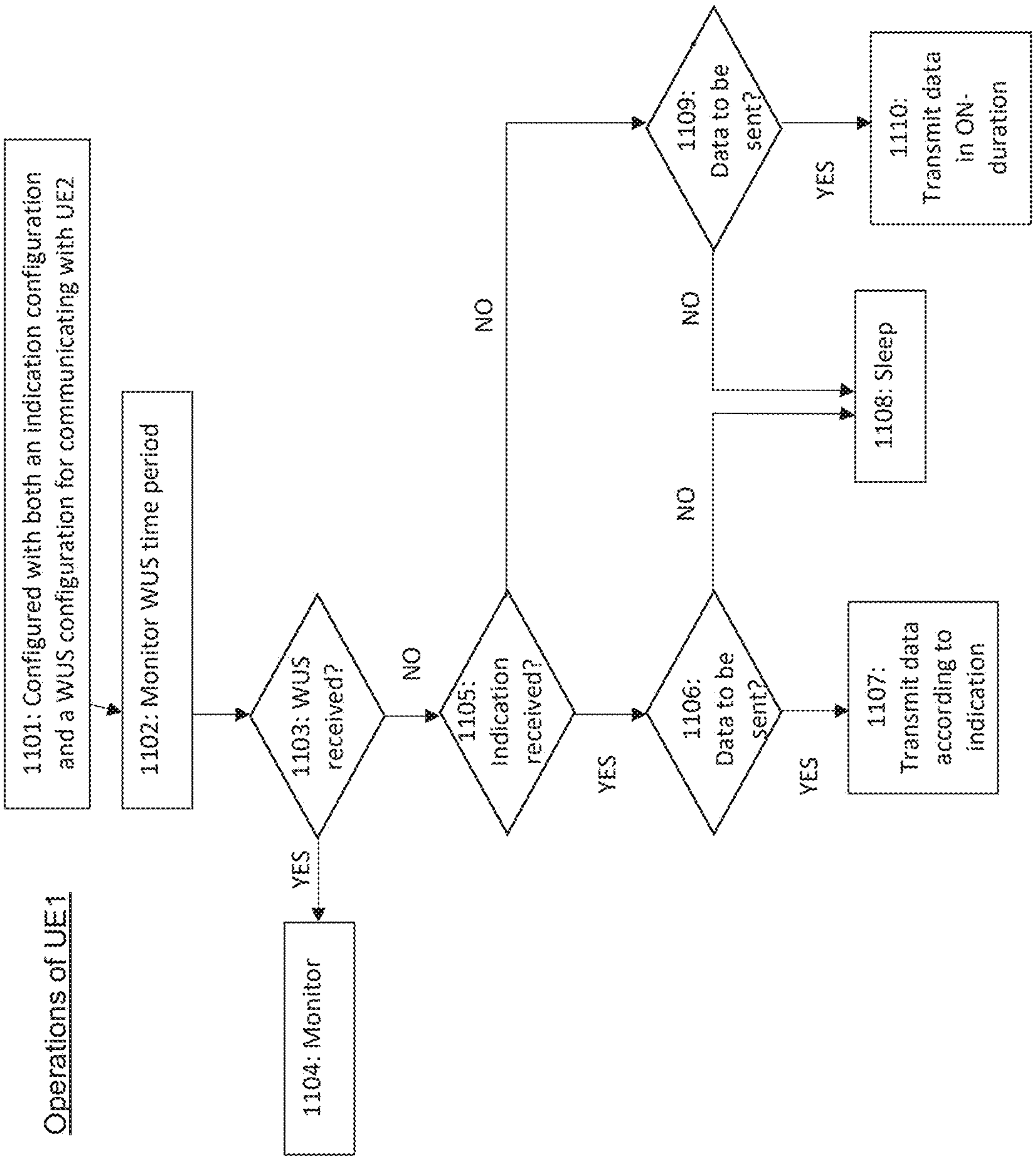

The following described flow charts of FIGS. 10 and 11 describe apparatus behaviours when a time for transmitting/receiving the indication and the scheduled time for monitoring for the WUS coincide. Before an indication/WUS occasion, UE2 decides if it should transmit indication or WUS in the indication/WUS occasion. Thus, the flowchart describing UE2's general behaviour is plotted in FIG. 10. Accordingly, FIG. 11 is used to describe UE1's general behaviour upon receiving a indication/WUS. In each of these Figures, UE2 is illustrated as being able to transmit either the indication or the WUS in one indication/WUS occasion of UE1, but not both. This may be applicable in the case that a WUS from UE2 to UE1 can also indicate that UE2 will be awake since it is transmitting.

FIG. 10 is a flowchart illustrating potential operations of UE2 in the presently described example.

At 1001, UE2 is configured with both an indication configuration and a WUS configuration for communicating with UE1. This may be as described above.

At 1002, UE2 determines whether or not there is data to be sent to UE1 in UE1's ON-duration following the upcoming indication/WUS occasion.

When there such data according to 1002, UE2 proceeds to 1003,

At 1003, UE2 sends a WUS in the upcoming scheduled indication/WUS time period for UE1.

Subsequent to 1003, at 1003 UE2 send the data to UE1 during UE1's ON-duration.

When there is not such data according to 1002, UE2 proceeds to 1005.

At 1005, UE2 determines whether or not to monitor the interface for direct UE to UE communications (e.g. PC5 interface) after the upcoming scheduled indication/WUS time period for UE1. When 1005 is determined in the negative, UE2 proceeds to sleep in 1006. When 1005 is determined in the affirmative, UE2 proceeds to 1007.

At 1007, UE2 sends the indication in UE1's upcoming scheduled indication/WUS time period.

At 1008, subsequent to 1007, UE2 continues to monitor the interface for direct UE to UE communications (e.g. PC5 interface).

FIG. 11 is a flowchart illustrating potential operations of a UE1 interacting with the UE2 of FIG. 10.

At 1101, UE1 is configured with both an indication configuration and a WUS configuration for communicating with UE2. This may be as described above.

At 1102, UE1 monitors its upcoming scheduled indication/WUS time period.

At 1103, UE1 determines whether or not a WUS has been received from UE2. If this is determined in the affirmative, UE1 proceeds to 1104, in which UE1 monitors the interface/ link for direct communication with another UE (e.g. the PC5 link) in the following ON-duration scheduled in sidelink discontinuous reception.

It 1103 is determined in the negative, UE1 proceeds to 1105, in which UE1 determines whether or not an indication has been received from UE2. If the answer to 1105 is in the affirmative, UE1 proceeds to 1106.

At 1106, UE1 determines whether or not UE1 has data to send to UE2. If the answer to this is in the affirmative, UE1 proceeds to 1107, in which UE1 starts transmitting the data to UE2 according to the received indication. If the answer to 1106 is instead in the negative, UE1 instead proceeds to 1108, in which UE1 goes to sleep. If 1105 is instead answered in the negative, UE1 proceeds to 1109.

At 1109, UE1 determines whether or not UE1 has data to send to UE2. If the answer to this is in the affirmative, UE1 proceeds to 1110, in which UE1 starts transmitting the data to UE2 in the next sidelink DRX ON-duration of UE2. If the answer to 1109 is instead in the negative, UE1 instead proceeds to 1108, in which UE1 goes to sleep.

The next two example flow chart discussions relate to an example in which UE2 may determine to send indication independent from its decision to send WUS. This situation may occur, for example, when the indication occasion is different from the WUS occasion. Alternatively, this situation may occur when UE2 may send both indication and WUS to UE1 in one indication/WUS occasion of UE1 to indicate that UE2 is both awake to receive from UE1 and having data to transmit to UE1. In this case, the determination to send indication may be independent from the determination to send WUS, where the behaviours of UE2 and UE1 for sending and receiving indication are shown in FIG. 12 and FIG. 13, respectively.

Figure 12:
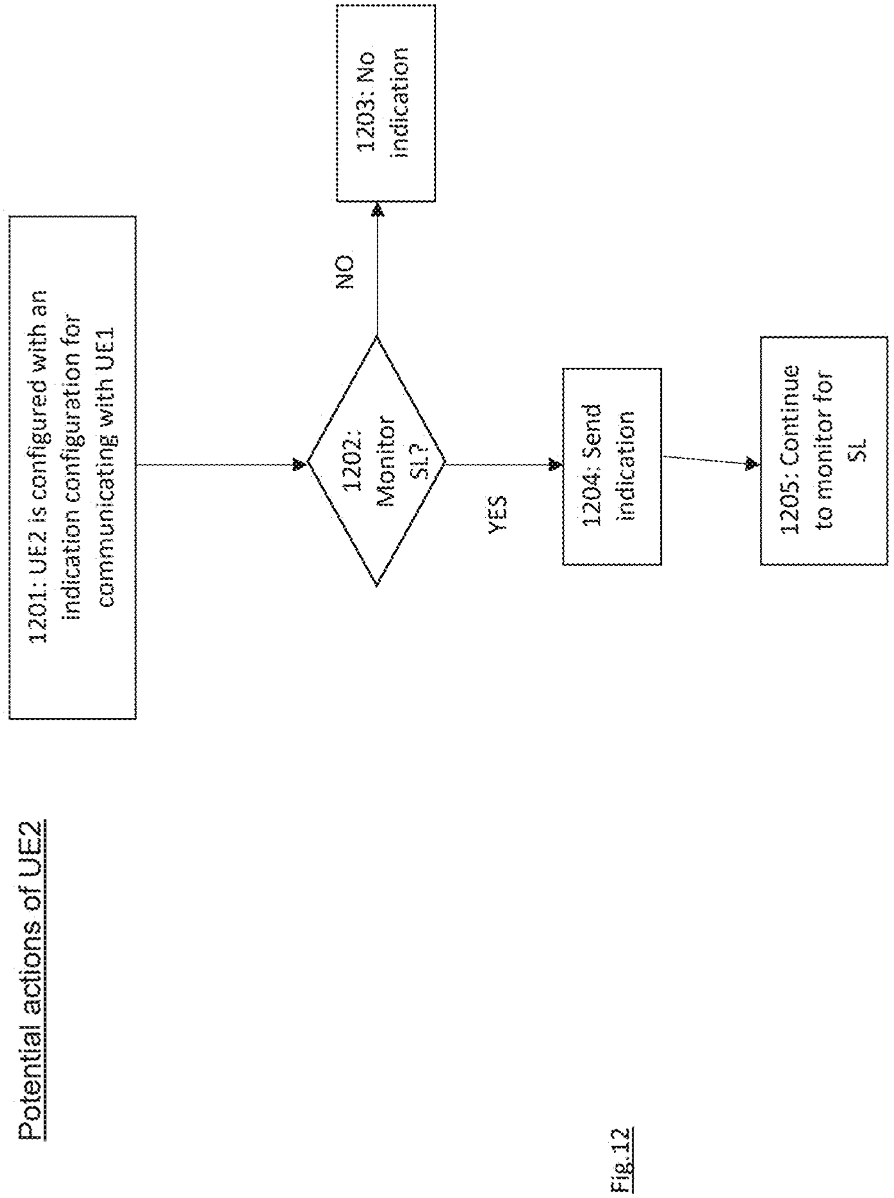
Figure 13:
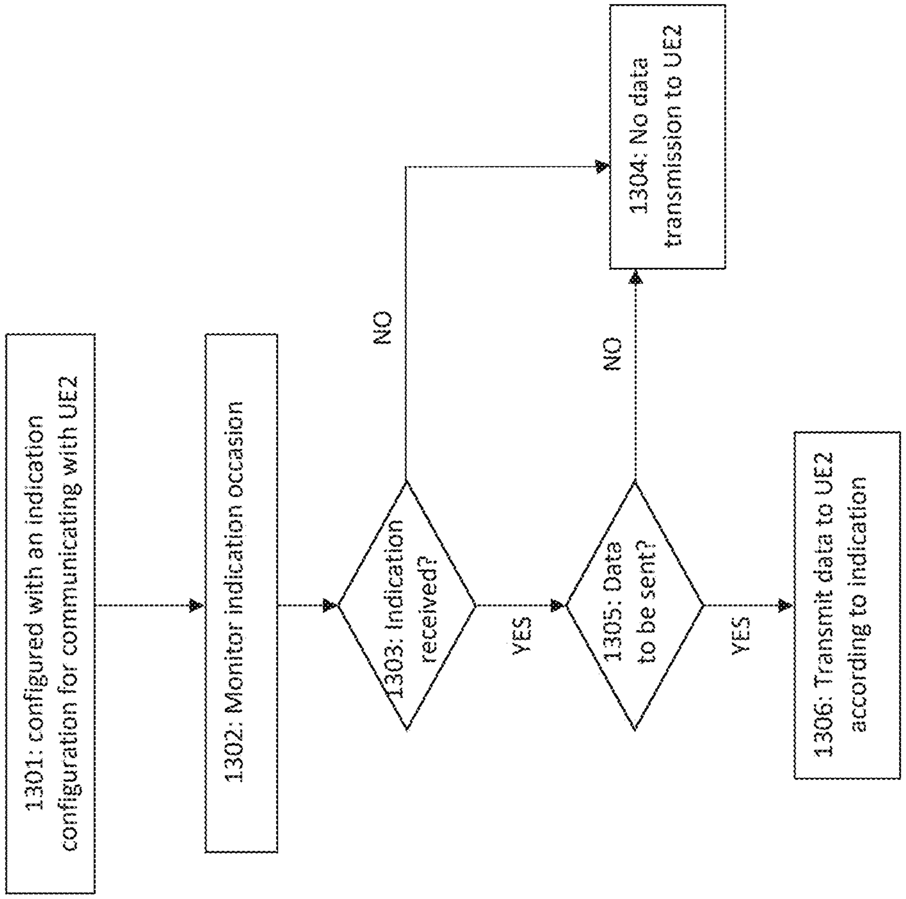

FIG. 12 relates to potential actions of UE2.

At 1201, UE2 is configured with an indication configuration for communicating with UE1, as per the above-described examples.

At 1202, UE2 determines whether or not it will monitor the interface for direct communications between UE2 and its peers (e.g. the PC5 interface) after the upcoming indication occasion for UE1. When UE2 determines 1202 in the negative, UE2 proceeds to 1203 and does not send any indication.

When UE2 determines 1202 in the positive, UE2 proceeds to 1204 and sends the indication in UE1's next indication occasion. After 1204, UE2 proceeds to 1205, in which UE2 continues to monitor the interface for direct communications between UE2 and its peers (e.g. the PC5 interface).

FIG. 13 is a flow chart illustrating potential actions that may be performed by UE1 interacting with UE2 of FIG. 12.

At 1301, UE1 is configured with an indication configuration for communicating with UE2, as per the above-described examples.

At 1302, UE1 monitors its indication occasion.

At 1303, UE1 determines whether or not an indication is received from UE2 during the indication occasion. When UE1 determines 1303 in the negative, UE1 proceeds to 1304. in which UE1 does not transmit data to UE2.

When UE1 determines 1303 in the affirmative, UE1 proceeds to 1305, in which UE1 determines whether or not UE1 has data to be sent to UE2. When UE1 determines 1305 in the negative, UE1 proceeds to 1304. in which UE1 does not transmit data to UE2.

When UE1 determines 1305 in the positive, UE1 starts transmitting the data to UE2 according to the received indication at 1306.

The following provides further specific examples related to potential signal characteristics, as well as the physical resources (i.e. time-frequency combinations) that can be used to transmit the actual signal carrying the indication. It is noted, the actual indication design may vary without changing any of the above disclosure in relation to UE1 and UE2. The following example indication design(s) is provided for completeness.

In one example, the indication may have a similar form as the WUS to be transmitted in sidelink unicast. The form may thus develop and evolve and the form of the WUS is developed and evolved in 3GPP.

Looking at the design over the Uu interface (i.e. the interface between the UE and an access point), and considering the currently proposed form of the WUS in LTE, the indication may similarly comprise a Zadoff-Chu type of signal when the indication is based on the WUS. However, the indication may have a different cyclic shift of the Zadoff-Chu code compared to the WUS. Having a different cyclic shift compared to the WUS may cause the signals to be orthogonal to each other, mitigating interference effects. The differentiation between the WUS and the indication, when both these signals use the same resources, is required so that the receiving UE knows how to interpret the received signal.

As another example, the indication may be similar to the DCI-based DCP introduced in 3GPP Release 16. In this case, a specific sidelink control information (SCI) format can be introduced to indicate either the WUS and/or the indication.

As another example, a specific Medium Access Control (MAC) or RRC information element (IE) can be introduced to indicate either the WUS and/or indication indications.

In terms of the actual resources used for the transmission of the WUS and/or indication, this may depend on the design of the WUS and indication.

For example, for sequence type of signals (e.g. a Zadoff-Chu sequence), a symbol or set of symbols (including the frequency domain) in a resource pool slot can be reserved. These specific symbols can be part of the resource pool configuration, similar to the case of the physical sidelink feedback channel (PSFCH). When the specific symbols are part of the resource pool configuration, then the specific symbols to activate certain resources of all the available resources made available from the resource pool configuration can be selected and agreed as part of the DRX configuration alignment between peer sidelink UEs. In this case, the indication monitoring may imply the need for the indication monitoring UE to wake-up, but not of PSCCH monitoring.

As another example, for DCP like type of WUS/indication, a slot or set of slots in a resource pool can be reserved for that purpose. In alternative, this can also be transparent to the resource pool configuration as a WUS/indication may occur within a slot. The only aspects needed to be reflected in the resource pool configuration is the physical sidelink control channel (PSCCH) format, for the case where a new first stage Sidelink Control Information format is introduced.

Figure 14:
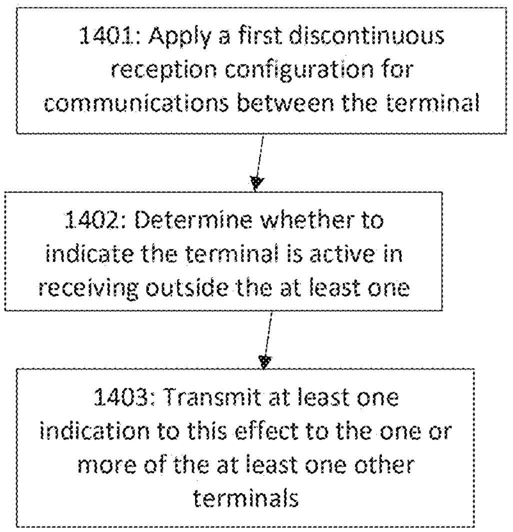
FIGS. 14 and 15 are example flow charts illustrating potential operations performed by terminals.
Figure 15:
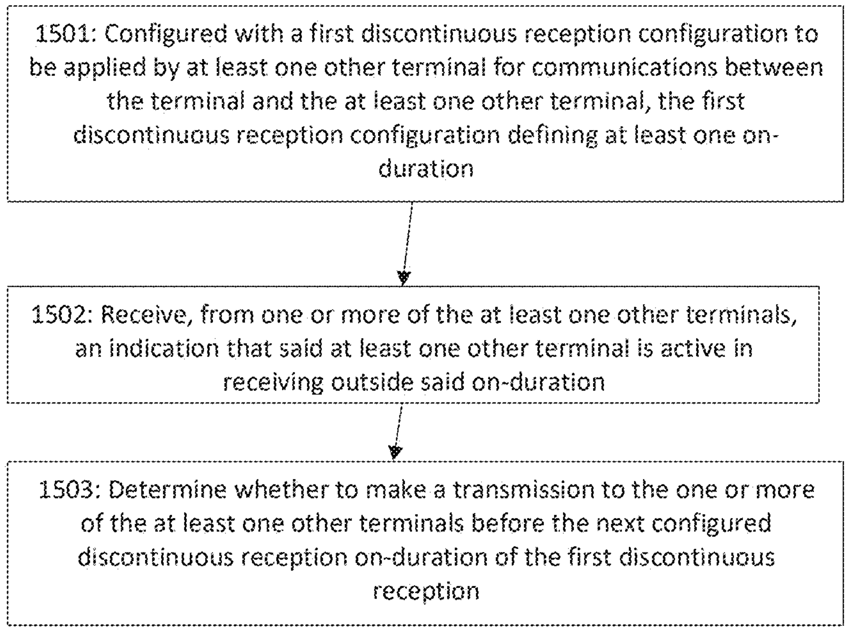

FIGS. 14 and 15 are flow charts are example flow chart illustrating example operations that may be performed by apparatus described herein. Both of these apparatuses may be comprised within respective terminals/UEs. Moreover, where the following refers to communications between terminals, this may refer to direct communications between terminals (i.e. without involving an access point to a network and/or without involving a core network apparatus).

FIG. 14 illustrates potential operations that may be performed by an apparatus for a terminal.

At 1401, the apparatus applies a first discontinuous reception configuration for communications between the terminal and at least one other terminal. This first discontinuous reception may have been configured at the apparatus in any of a plurality of different ways, including via a network instruction and via negotiation with the at least one other terminal.

The first discontinuous reception configuration comprises at least one on-duration. During the on-duration, the terminal is awake and/or active for receiving communications from the at least one other terminal. The first discontinuous reception configuration may comprise a plurality of on-durations. The on-durations may be triggered to occur in response to receipt of a wake up signal from at least one other terminal. The first discontinuous reception period may comprise a plurality of windows during which a wake up signal may be received. These plurality of windows may be periodic.

At 1402, the apparatus may determine whether to indicate the terminal is active in receiving outside the at least one on-duration. The terminal is considered to be active in receiving when it is able to receive at least one communication from the at least one other terminal other than a wake up signal.

When it is determined to indicate the apparatus is active in receiving outside the on-duration, at 1403 the apparatus transmits at least one indication to this effect to the one or more of the at least one other terminals.

The indication may comprise at least one further information from: a minimum time that the terminal will be active in receiving; an indication of a radio channel quality/condition; and a resource indication. The resource indication may be an indication of at least one frequency and/or time resource, such as a resource element. The indication of the radio channel quality may be a received signal power, a received signal strength indicator, a received signal quality, and/or any other metric for indicating a radio channel quality. The at least one further information may be provided implicitly in the indication.

The apparatus may be configured with a second discontinuous reception configuration for communications between the terminal and the at least one other terminal. It is noted that the terminal may be said to also apply the second discontinuous reception configuration in the sense that the terminal may transmit to the at least one other terminal during at least one on-duration defined by the second discontinuous reception configuration (see below). Further, it is noted that a terminal "applying" a discontinuous reception configuration is configured with that discontinuous reception configuration. However, for clarity with respect to FIGS. 14 and 15, the phrase "configured with" will be used to clarify that the entity so configured may transmit, rather than receive. Similarly, "applying" will be used in relation to FIGS. 14 and 15 to denote that the applying entity may receive, rather than transmit.

The second discontinuous reception configuration may have a similar structure to the first discontinuous reception configuration, albeit with different timing and/or timing intervals. In particular, the second discontinuous reception configuration comprises at least one on-duration. During the on-duration, the at least one other terminal is awake and/or active for receiving communications from the terminal. Moreover, during at least one of the on-durations defined by the second discontinuous reception configuration, the terminal may transmit communications to the at least one other terminal. The second discontinuous reception configuration may comprise a plurality of on-durations. The on-durations may be triggered to occur in response to receipt of a wake up signal from the terminal. The second discontinuous reception period may comprise a plurality of windows during which a wake up signal may be received. These plurality of windows may be periodic.

The indication may be transmitted during a first time and/or frequency resource configured for the one or more of the at least one other terminals to receive a wake up signal as part of said second discontinuous reception configuration.

The indication may be transmitted during a second time and/or frequency resource that is independent of a first time and/or frequency resource configured for the one or more of the at least one other terminals to receive a wake up signal as part of said second discontinuous reception configuration.

Said determining whether to indicate the terminal is active in receiving outside the on-duration to the one or more of the at least one other terminals may comprise determining that an active time of the terminal will be extended. The active time of the terminal may be a time during which the terminal is configured to receive a communication other than a wakeup signal from the at least one other terminal. Therefore, the active time may comprise the initial on-duration and an extended receive window.

Said determining whether to indicate the terminal is active in receiving outside the on-duration to the one or more of the at least one other terminals comprises determining at least one of: a time difference between transmission of the indication and the next configured discontinuous reception on-duration; a time difference between transmission of the indication and an projected end of an active time of said receiving; and whether an upper layer of the terminal has predicted that the one or more of the at least one other terminals has information to transmit to the terminal. The active time of said receiving may be a time during which the terminal is configured to receive a communication other than a wakeup signal from the at least one other terminal.

The terminal may receive a communication (other than a wakeup signal) from the at least one other terminal outside of the at least one on-duration.

FIG. 15 is a flow chart illustrating potential operations of an apparatus for a terminal. This terminal may interact with the terminal of FIG. 14.

At 1501, the apparatus is configured with a first discontinuous reception configuration to be applied by at least one other terminal for communications between the terminal and the at least one other terminal, the first discontinuous reception configuration defining at least one on-duration. The first discontinuous reception configuration may be as discussed above in relation to FIG. 14. In particular, it is noted that the first discontinuous reception configuration defines the at least one on-duration during which the at least one other terminal is configured to receive communications/have powered up receiving circuitry, and during which the terminal may transmit communications to the at least one other terminal.

At 1502, the apparatus receives, from one or more of the at least one other terminals, an indication that said at least one other terminal is active in receiving outside said on-duration.

At 1503, the apparatus determines whether to make a transmission to the one or more of the at least one other terminals before the next configured discontinuous reception on-duration of the first discontinuous reception.

The indication may comprise at least one further information from: a minimum time that the terminal will be active in receiving; an indication of a radio channel quality/condition; and a resource indication. The resource indication may be an indication of at least one frequency and/or time resource, such as a resource element. The indication of the radio channel quality may be a received signal power, a received signal strength indicator, a received signal quality, and/or any other metric for indicating a radio channel quality. The at least one further information may be provided implicitly in the indication.

The apparatus may apply a second discontinuous reception configuration for communications between the terminal and the at least one other terminal. The second discontinuous reception configuration may be as discussed above in relation to FIG. 14. The indication may be transmitted during a first time and/or frequency resource configured for the one or more of the at least one other terminals to receive a wake up signal as part of said second discontinuous reception configuration.

The apparatus may apply a second discontinuous reception configuration for communications between the terminal and the at least one other terminal. The second discontinuous reception configuration may be as discussed above in relation to FIG. 14. The indication may be transmitted during a second time and/or frequency resource that is independent of a first time and/or frequency resource configured for the one or more of the at least one other terminals to receive a wake up signal as part of said second discontinuous reception configuration.

The apparatus may comprise means for determining to transmit data to the one or more of the at least one other terminals during a configured discontinuous reception on-duration of said one or more terminals. The apparatus may transmit data to the one or more of the at least one other terminals by using the further information. It is understood that the apparatus may determine to not transmit data to the one or more of the at least one other terminals. As example of then this may happen, the apparatus may determine to not transmit data when the apparatus determines that the signal quality would not meet a minimum signal quality threshold for the data being transmitted, and/or if the apparatus does not have data to transmit.

It is noted that the presently described indications are only a small selection of the possible design options available for this indication. In each case, however, for greatest efficiency the indication may have a similar-enough form as the WUS such that it can be sent in the same time—and/or—frequency resource as the WUS and/or in the same physical layer channel/structure as the WUS. This is more efficient as the indication receiving UE can monitor one time—and/or—frequency occasion to derive both if an indication has been sent by a peer UE (e.g. UE2) and if a WUS has been received.

Figure 2:
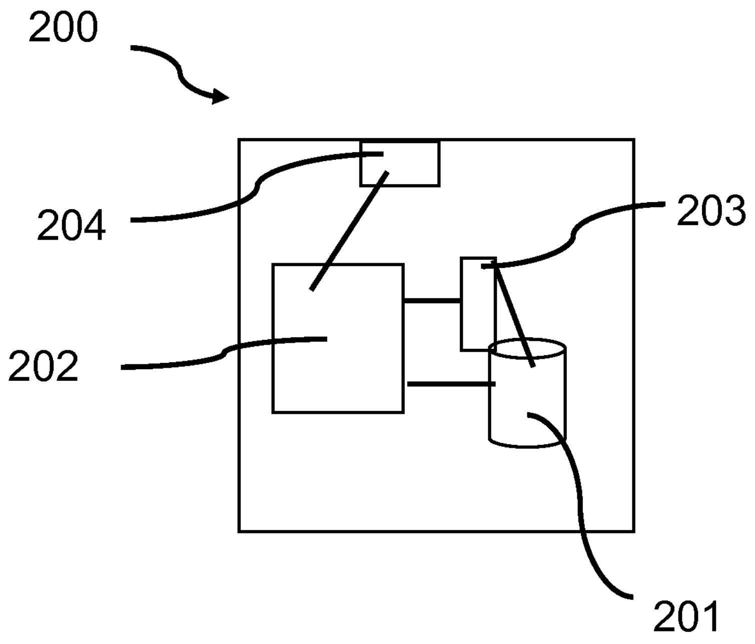
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example the control apparatus 200 or processor 201 can be configured to execute an appropriate software code to provide the control functions.

Figure 3:
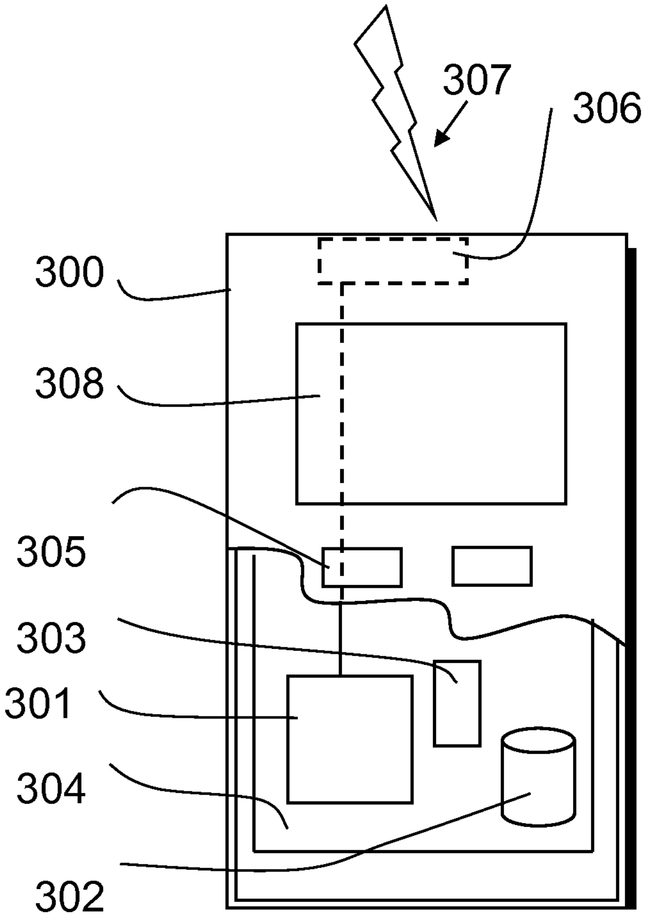
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
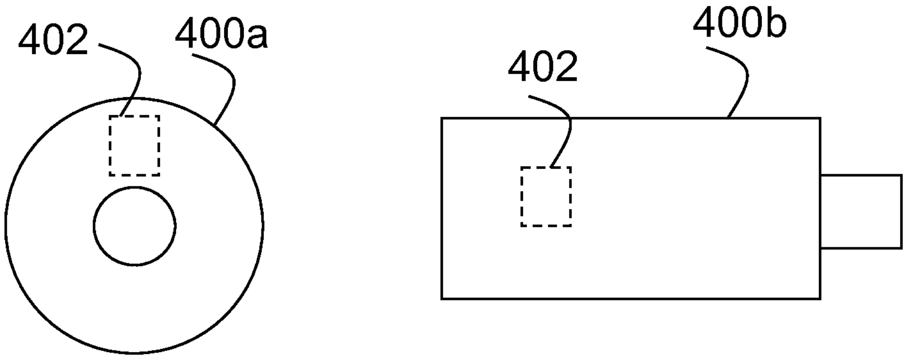
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400*a* (e.g. computer disc (CD) or digital versatile disc (DVD)) and 400*b* (e.g. universal serial bus (USB) memory stick) storing instructions and/or parameters 402 which when executed by a processor allow the processor to perform one or more of the steps of the methods of FIG. 14 and/or FIG. 15.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 14 and/or FIG. 15, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A terminal comprising at least one processor, and at least one memory including computer program code, wherein the at least one memory and the computer program code are configured, with the at least one processor, to cause the terminal to:

apply a first discontinuous reception configuration for communications between the terminal and at least one other terminal, the first discontinuous reception configuration comprising at least one on-duration;

determine whether to indicate the terminal will be active in receiving during a time period outside the at least one on-duration; and when it is determined to indicate the terminal will be active in receiving during a time period outside the at least one on-duration, transmit at least one indication to one or more of the at least one other terminal indicating that the terminal will be active in receiving during a time period outside the at least one on-duration.

2. The terminal as claimed in claim 1, wherein the indication comprises at least one further information element indicating at least one of: a minimum time that the terminal will be active in receiving; an indication of a radio channel quality; and a resource indication.

3. The terminal as claimed in claim 2, wherein the at least one further information element is provided implicitly in the indication, wherein the terminal is further caused to determine an indication configuration from a plurality of indication configurations, wherein the determined indication configuration is used for transmitting the indication, and wherein each indication configuration indicates corresponding information different from another configuration indication.

4. The terminal as claimed in claim 1, wherein the terminal is configured with a second discontinuous reception configuration to be applied by the at least one other terminal for communications between the terminal and the at least one other terminal, wherein the indication is transmitted during at least one of a first time or frequency resource configured for the one or more of the at least one other terminal to receive a wake up signal as part of said second discontinuous reception configuration.

5. The terminal as claimed in claim 1, wherein the terminal is configured with a second discontinuous reception configuration to be applied by the at least one other terminal for communications between the terminal and the at least one other terminal, wherein the indication is transmitted during at least one of a second time or frequency resource that is independent of at least one of a first time or frequency resource configured for the one or more of the at least one other terminal to receive a wake up signal as part of said second discontinuous reception configuration.

6. The terminal as claimed in claim 1, wherein said determining whether to indicate the terminal will be active in receiving outside the on-duration to the one or more of the at least one other terminal comprises determining that an active time of the terminal will be extended.

7. The terminal as claimed in claim 1, wherein said determining whether to indicate the terminal will be active in receiving outside the on-duration to one or more of the at least one other terminal comprises determining at least one of; a time difference between transmission of the indication and next configured discontinuous reception on-duration; a time difference between transmission of the indication and an projected end of an active time of said receiving; and whether an upper layer of the terminal has predicted that the one or more of the at least one other terminal has information to transmit to the terminal.

8. The terminal as claimed in claim 1, wherein the at least one memory and the computer program code are configured, with the at least one processor, to cause the terminal to: receive a communication from the at least one other terminal outside of the at least one on-duration.

9. A terminal, wherein the terminal is configured with a first discontinuous reception configuration to be applied by at least one other terminal for communications between the terminal and the at least one other terminal, the first discontinuous reception configuration comprising at least one on-duration, and wherein the terminal comprises at least one processor, and at least one memory including computer program code, wherein the at least one memory and the computer program code are configured, with the at least one processor, to cause the terminal to:

receive from one or more of the at least one other terminal an indication that said at least one other terminal will be active in receiving during a time period outside the at least one on-duration; and determine, based on the indication, whether to make a transmission to the one or more of the at least one other terminal before next configured discontinuous reception on-duration of the first discontinuous reception.

10. The terminal as claimed in claim 9, wherein the indication comprises at least one further information element indicating at least one of: a minimum time that the one or more of the at least one other terminal will be active in receiving; an indication of a radio channel quality/condition; and a resource indication.

11. The terminal as claimed in claim 10, wherein the at least one further information element is provided implicitly in the indication.

12. The terminal as claimed in claim 10, wherein the at least one memory and the computer program code are configured, with the at least one processor, to cause the terminal to:

transmit data to the one or more of the at least one other terminal by using the at least one further information element.

13. The terminal as claimed in claim 9, wherein the at least one memory and the computer program code are configured, with the at least one processor, to cause the terminal to:

apply a second discontinuous reception configuration for communications between the terminal and the at least one other terminal, wherein the indication is received during at least one of a first time or frequency resource configured for the terminal to receive a wake up signal as part of said second discontinuous reception configuration.

14. The terminal as claimed in claim 9, wherein the at least one memory and the computer program code are configured, with the at least one processor, to cause the terminal to:

apply a second discontinuous reception configuration for communications between the terminal and the at least one other terminal, wherein the indication is received during at least one of a second time or frequency resource that is independent of at least one of a first time or frequency resource configured for the terminal to receive a wake up signal as part of said second discontinuous reception configuration.

15. The terminal as claimed in claim 9, wherein the at least one memory and the computer program code are configured, with the at least one processor, to cause the terminal to:

determine to transmit data to the one or more of the at least one other terminal during an on-duration of the first discontinuous reception configuration.

16. A method for a terminal, the method comprising:

applying a first discontinuous reception configuration for communications between the terminal and at least one other terminal, the first discontinuous reception configuration comprising at least one on-duration;

determining whether to indicate the terminal will be active in receiving during a time period outside the at least one on-duration; and when it is determined to indicate the terminal will be active in receiving during a time period outside the at least one on-duration, transmitting at least one indication to one or more of the at least one other terminal indicating that the terminal will be active in receiving during a time period outside the at least one on-duration.

* * * * *